United States Patent
Wechsler et al.

(10) Patent No.: US 8,073,287 B1
(45) Date of Patent: Dec. 6, 2011

(54) RECOGNITION BY PARTS USING ADAPTIVE AND ROBUST CORRELATION FILTERS

(75) Inventors: Harry Wechsler, Fairfax, VA (US); Hung Lai, Fairfax Station, VA (US); Venkatesh Ramanathan, Vienna, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 839 days.

(21) Appl. No.: 12/036,780

(22) Filed: Feb. 25, 2008

Related U.S. Application Data

(60) Provisional application No. 60/891,674, filed on Feb. 26, 2007.

(51) Int. Cl.
*G06K 9/64* (2006.01)

(52) U.S. Cl. ........ 382/278; 382/294; 382/118; 382/103; 359/306

(58) Field of Classification Search .................. 382/278, 382/294, 118, 103; 359/306
See application file for complete search history.

(56) References Cited

U.S. PATENT DOCUMENTS

| | | | | |
|---|---|---|---|---|
| 4,967,093 A * | 10/1990 | Takemori | ............... | 250/559.2 |
| 5,453,840 A * | 9/1995 | Parker et al. | ............... | 356/400 |
| 5,485,224 A * | 1/1996 | Burns et al. | ............... | 348/699 |
| 5,757,422 A * | 5/1998 | Matsumura | ............... | 348/169 |
| 5,947,413 A * | 9/1999 | Mahalanobis | ............... | 244/3.17 |
| 6,141,578 A * | 10/2000 | Hardy | ............... | 600/410 |
| 6,307,959 B1 * | 10/2001 | Mandelbaum et al. | ............... | 382/154 |
| 6,990,254 B2 * | 1/2006 | Nahum | ............... | 382/278 |
| 6,996,291 B2 * | 2/2006 | Nahum | ............... | 382/278 |
| 7,046,823 B2 * | 5/2006 | Albus et al. | ............... | 382/103 |
| 7,065,258 B2 * | 6/2006 | Nahum | ............... | 382/278 |
| 7,068,844 B1 * | 6/2006 | Javidi et al. | ............... | 382/218 |
| 7,085,431 B2 * | 8/2006 | Jones et al. | ............... | 382/278 |
| 7,386,187 B2 * | 6/2008 | Solomon et al. | ............... | 382/276 |
| 7,421,090 B2 * | 9/2008 | Muise et al. | ............... | 382/103 |
| 7,526,100 B1 * | 4/2009 | Hartman et al. | ............... | 382/103 |
| 7,885,480 B2 * | 2/2011 | Bryll et al. | ............... | 382/278 |
| 2001/0033702 A1 * | 10/2001 | Kawabata | ............... | 382/294 |
| 2004/0047492 A1 * | 3/2004 | Muise et al. | ............... | 382/103 |
| 2005/0013507 A1 * | 1/2005 | Lee et al. | ............... | 382/284 |
| 2005/0018925 A1 * | 1/2005 | Bhagavatula et al. | ............... | 382/278 |
| 2006/0045314 A1 * | 3/2006 | Gao et al. | ............... | 382/106 |

OTHER PUBLICATIONS

Savvides et al., Efficient design of advanced correlation filters—Recognition, IEEE, 0-7695-1971, 2003 pp. 1-8.*
Heo et al., Advanced correlation filters—Imagery, Springer, ICIAR LNCS 3656, 2005, pp. 1089-1097.*
Advanced—Imagery, Heo et al., Springer, ICIAR LNCS 3656, 2005, pp. 1089-1097.*
Efficient design—Filters, Savvides et al, IEEE, 07695-1971,2003, pp. 1-8.*
Robot Vision—Generation, Inoue et al., IEEE, ICOR&A, May 1992, pp. 1621-1626.*

* cited by examiner

*Primary Examiner* — Jayesh A Patel
(74) *Attorney, Agent, or Firm* — David Grossman; David Yee

(57) ABSTRACT

A recognition-by-parts authentication system for determining if a physical test target represented in test image(s) obtained using an imaging device matches a physical training target represented in training image(s). The system includes a multitude of adaptive and robust correlation filters. Each of the adaptive and robust correlation filters is configured to generate correlation-peak-strength and distance-from-origin data using a multitude of related images. Each of the multitude of related images representing a similar part of a larger image. The related images originate from the test image(s) and training image(s).

18 Claims, 22 Drawing Sheets

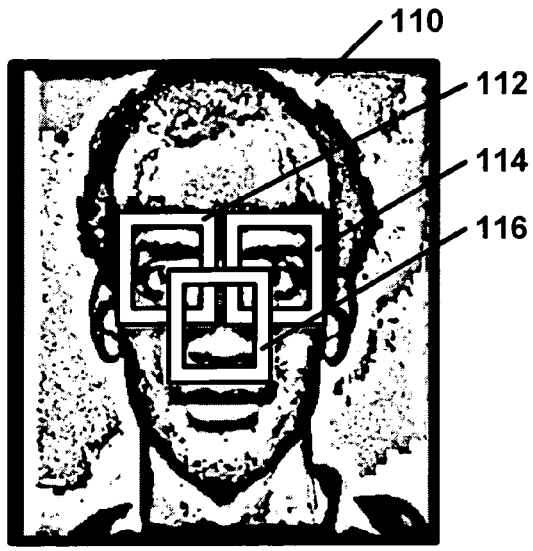
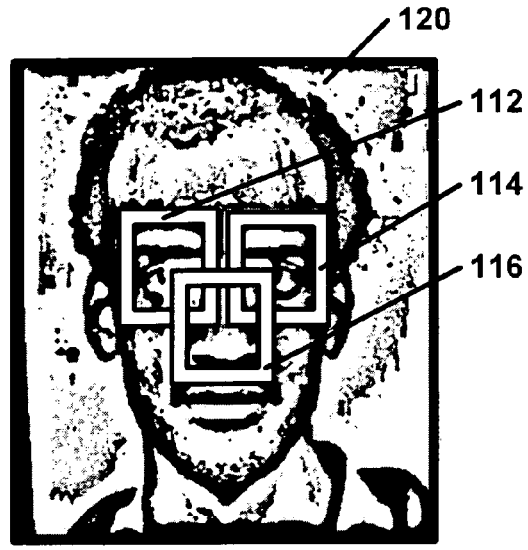
FIG. 1A    FIG. 1B
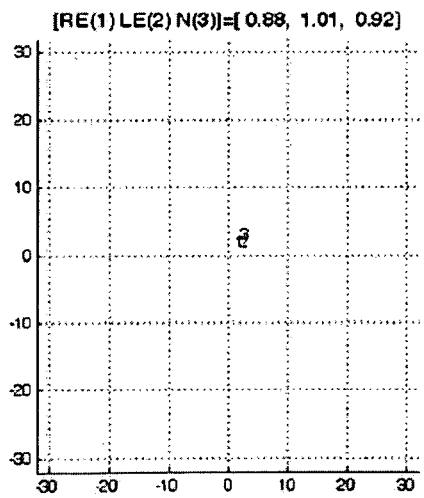
FIG. 1C

RECOGNITION BY PARTS USING ADAPTIVE AND ROBUST CORRELATION FILTERS

CROSS-REFERENCE TO RELATED APPLICATIONS

This application claims the benefit of U.S. Provisional Application No. 60/891,674, filed Feb. 26, 2007, entitled "Recognition of Occluded and Disguised Faces Using adaptive and Robust Correlation Filters," which is hereby incorporated by reference in its entirety.

BACKGROUND

A reliable recognition system is needed that can effectively recognize targets (such as faces, vehicles, animals, etc.) that have been modified to hide their true identity. Some targets of interest may include camouflaged or occluded military installations, weapons and vehicles. Still other targets of interest may include human beings, and in some instances, human faces.

In the field of biometric analysis, denial stands for occlusion, and deception stands for masking. Both denial and deception affect biometric analysis. Biometrics should not assume that the personal signatures are complete and reliable. Occlusion and disguise are not necessarily deliberate. They can also take place in crowded environments, e.g., CCTV when only parts of faces are visible from time to time. Temporal changes can also easily deceive current face recognition engines. Examples of phenomena, with deceptive impact, include bags under the eyes and wrinkles from aging, changes in appearance due to the use of cosmetics, medical condition (injuries and allergies), fatigue, hair style and facial hair. "Our face reflects the lifelong pull of gravity, which lengthens the jaws and deepens orbital bags. In addition people develop fat pads under the eyes, shadows fall differently on the upper and lower eyelid" [1]. Current face recognition systems are ineffective when temporal changes, involuntary or not, occur. In addition, the working hypothesis for the (large) face recognition evaluations carried out so far has not been particularly concerned with the very possibility that targets would seek to deny and/or foil their true biometric signatures. Most clients are legitimate and honest. They have nothing to hide, and have all the incentives to cooperate. The very purpose of biometrics, however, is to provide security from impostors and those seeking to breach security. It is quite obvious that such clients are well motivated to interfere with the proper acquisition of their biometric signatures, and will attempt to hide and/or alter information that is needed for their identification. As occlusion and disguise usually affect only parts of the face.

BRIEF DESCRIPTION OF THE SEVERAL VIEWS OF THE DRAWINGS

FIG. 1A shows three masks applied to a training face image to extract out the face parts corresponding to the right eye (RE), left eye (LE), and nose (N), as per an aspect of an embodiment of the present invention.

FIG. 1B shows three masks applied to a test face image as per an aspect of an embodiment of the present invention.

FIG. 1C shows correlation peaks for the face images shown in FIG. 1A and FIG. 1B using match filters as per an aspect of an embodiment of the present invention.

DETAILED DESCRIPTION OF EMBODIMENTS

Figure 2A:
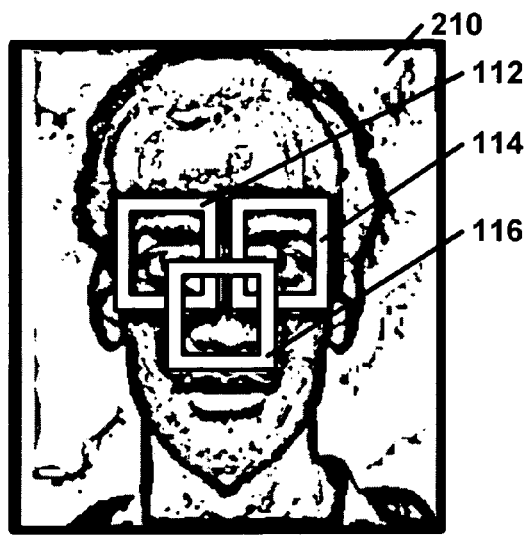
FIG. 2A shows three masks applied to a training face as per an aspect of an embodiment of the present invention.

Embodiments of the present invention address the problem of reliable face recognition despite occlusion and disguise, which correspond to missing and altered face components, respectively. Much of this disclosure discusses the embodiments with respect to face recognition; however, alternative embodiments may be used to recognize other targets such as automobiles, tanks, animals, terrain, and buildings. A new Adaptive and Robust Correlation Filter (ARCF) is introduced that may be used to aid recognition.

Also disclosed is a novel recognition-by-parts approach that uses banks of Adaptive and Robust Correlation Filters (ARCF) that are optimized (correlation) filters for the component-based and holistic mix of components. In the case of face recognitions, the cluster and strength of the ARCF correlation peaks indicate the confidence of the face authentication made, if any. Occluded or disguised components, which show up as missing or weak correlation peaks, are identified as such. ARCF show that (i) the use of the whole face and its half sides as components benefits the face Recognition-by-parts paradigm; and that (ii) the face parts should record both representation and location across the face. ARCF expand on MACE filters and adaptive beamforming from radar/sonar. The decision thresholds learned a priori from one data base, e.g., FERET, are shown to carry over successfully to another data base, e.g., AR. The FERET database, managed by the Defense Advanced Research Projects Agency (DARPA) and the National Institute of Standards and Technology (NIST), is a large database of facial images that was gathered independently from algorithm developers by Dr. Harry Wechsler at George Mason University.

The adaptive aspect of ARCF comes from its derivation using both training and test data, while the robust aspect comes from ARCF being optimized to decrease their sensitivity to noise/distortions. The close similarity between the ARCF design using correlation filters and the Tikhonov regularization framework is discussed. Experimental evidence shows the feasibility and utility of ARCF for recognition-by-parts, in general, and reliable recognition of occluded and disguised faces, in particular. The disclosure also shows that ARCF show similar performance to people when processing face images whose part configurations are wrongly assembled.

Recognition-by-parts is a structural and compositional alternative to holistic or statistical recognition methods. Its origins go back to the seminal work of Fischler and Elschlager [2] whose goal was "given some description of a visual object, find that object in an actual photograph." Fischler and Elschlager made the observation that "statistical decision theory, e.g., template matching using correlation, applies only when "we possess a precise description of the noise and distortion process which defines the mapping between the reference and its image in the sensed scene." Recognition-by-parts came in response to image variability, in general, and pose changes, in particular. The holistic approach solution for coping with variability required point correspondence using precise alignment. The solution proposed by Fischler and Elschlager "bypasses" the need for such requirements and instead includes a "combined descriptive scheme and decision [embedded] metric." The parts or nodes characteristic of Recognition-by-parts methods are referred to as components, landmarks or patches, and are held together or connected by linkages or strings. The philosophy surrounding recognition-by-parts, however, can be traced much further back according to Edelman et al. [3]. They quote from Plato's Theaetetus (360 BC), in which Socrates points out the circularity in treating syllables as combinations of letters, if the latter are to be defined merely as parts of syllables "What might seem to be the most ingenious of all:— that the elements or letters are unknown, but the combination or syllables known [ . . . ] can he be ignorant of either singly and yet know both together?" Recognition-by-parts facilitates face authentication when only parts of the face are visible and not masked. Towards that end embodiments of the present invention implements a novel implementation for realizing and implementing reliable Recognition-by-parts methods using adaptive and robust correlation filters (ARCF).

This disclosure will: (1) review handling of occlusion and disguise; (2) review holistic and configural cognitive face processing; (3) review computational recognition-by-parts; (4) introduce and assess correlation filters; (5) illustrate the use of correlation filters for recognition-by-parts; (6) describe new adaptive and robust correlation filters (ARCF) with a comparison against existing correlation filters; (7) describe the novel Recognition-by-parts architecture built around ARCF filters; and (8) present and experimental evaluation of an embodiment of the present invention.

Occlusion and Disguise:

Object recognition, in general, and face recognition, in particular, are severely hampered by occlusion and disguise. Occlusion corresponds to missing parts, while disguise is the result of masking or temporal changes in facial appearance. Both occlusion and disguise can foil biometric authentication. Evidence accumulation that overcomes missing or wrong information would thus benefit from searching for whatever reliable components are still available using the Recognition-by-parts paradigm. Face recognition research, including official competitions (see FRVT2002), does not account for tempering of biometric information. The limited attempts to handle occlusion (and implicitly also disguise) are mentioned next.

Kohonen [4] used the error-correcting properties of orthogonal projections for linear auto-associative memory recall to show that missing or noisy fragments can be recovered from a small collection of faces encoded using only eight gay levels. Gross et al. [5] have used eigen-subspaces derived using a sliding window that defines ID (entity) references as a sequence of signatures. A face of unknown identity is compared then with the stored reference sequences using Dynamic Space Warping (DSW), a variation on Dynamic Programming (DP) used for speech recognition. The image sizes used were quite small while the occlusions considered were limited in scope. The database available included a very large number, about 60 face images, for each client. The large number of images was needed to accommodate parameter estimation for DSW. Real life face recognition, however, handles large galleries of clients but it has access to very few photos per client.

Martinez [6] has suggested a (Gaussian or mixture of Gaussians) probabilistic approach that attempts to model the variation in image appearance due to errors in both face (and facial landmarks) localization and partial occlusion. To resolve the occlusion problem, each face is then divided into $k=6$ local but contiguous regions which are then analyzed in isolation. One major drawback of the method, which makes it impractical for real use, as explained by Martinez is due to the fact that "the ground-truth data (i.e., the correct localization of every feature to be localized on each face) is needed in order to estimate the error of a given localization algorithm. The problem is that the ground-truth data has to be obtained manually, which is a cost to be considered." Even more challenging is the fact that ground truth is required for both training and test data. Tan et al. [7] expanded on the approach used by Martinez using Self-Organized-Feature-Maps (SOMF) instead of the mixture of Gaussians. Their method also requires manual annotation and needs to be told ahead of time about occlusions and their location.

Humans can detect and identify faces with little or no effort even if only partial views (due to occlusion) are available. This skill is quite robust, despite changes in the visual stimulus due to viewing conditions and expression. Much of the research on face recognition has only focused so far on the use of full frontal images. Partial faces, however, are all what is sometimes available for training and/or testing (see Face in a Crowd scenarios characteristic of CCTV). Martinez [6] working on the synthetic ($\frac{1}{6}$ to $\frac{1}{3}$) occlusion problem reports different recognition rates for the left and right face images. Studies conducted on a much larger and real data set, have shown, however, that the left half, right half and the full face yield similar performance (about 95%) when matched against similar types of face images [8]. The method used was based on the Ensembles of Radial Basis Functions (ERBF) network, whose design and implementation take advantage of asymmetric faces, which is an example of visual "hallucination." Faces can be recognized from either their left or right half images when the face recognition engine is trained on full faces and tested on asymmetric faces constructed from either the left or right half augmented by their minor image [9].

ERBF implementation involves a simple and fully automated method using asymmetric faces (for either training or testing) and yields excellent results on a much larger data set (compared to the methods mentioned earlier) that consists of 150 clients whose face images were acquired under varying illumination. The recognition rate obtained was in excess of 90%. The asymmetric right face performance (96%) was slightly better than the asymmetric left face performance (92%) when the corresponding asymmetric faces were matched against the full face. One possible explanation for the right asymmetric face performing slightly better comes from the fact that, since the appearance for the nose is not symmetric, the asymmetric left face has a more pronounced nose or sometimes a "double" nose is present. Training on the left asymmetric faces and testing on the full face or training on the right asymmetric face and testing on the full face yield similar performance (92%) and yields better results than matching complete faces [9]. Finally, there is the case when both training and testing have access only to asymmetric faces. Training, done using ERBF, copes with both the inherent variability in the image formation process and the missing half of the face. The same data base as before included 150 clients for whom the pose rotation ranges across ±5° and yields 3,000 face images. The k-fold cross-validation face recognition rates obtained using the same type (left or right) of asymmetric faces during both training and testing was around 92%. The recognition rate falls to about 80% if training and testing take place using different (left vs. right or vice versa) asymmetric faces.

Liu et al. [10, 11] have even proposed to extend the use of facial asymmetry measures, a critical factor in evaluation of facial attractiveness [12] and expression [13], to human identification. Facial attractiveness for men is inversely related to recognition accuracy and asymmetrical faces are found less attractive. The explanation comes from the simple observation that asymmetrical faces are more distinctive and thus easier to remember and recognize. In particular, Liu et al. [11] have argued that asymmetric faces can be further exploited if combined with either eigenfaces or Fisherfaces representations. Building asymmetric faces required a face midline defined in terms of two canthi and a philtrum, fiducial landmarks marked manually under consistent lighting. The asymmetric faces, the Density Difference D-Face and the Edge Orientation Similarity S-Face, are then derived using reflection with respect to the face midline. Using a random set of 110 subjects from the FERET data base, a 38% classification error reduction rate was obtained. Error reduction rates of 45%-100% were achieved on 55 subjects from the Cohn-Kanade AU-Coded Facial Expression Database. The expressions produced on demand are likely to be more asymmetric than those elicited by real emotions.

Holistic and Configural Face Processing:

Yovel and Kanwisher [14] have shown, using fMRI studies of the Fusiform Face Area (FFA), that face perception is domain rather than process specific. Subjects had to discriminate among pairs of upright or inverted faces or houses stimuli that differed in either the spatial distance among parts (configuration) or the shape of the parts. "The FFA showed a much higher response to faces than to houses, but no preference for the configuration task over the part task." Such findings are relevant to Recognition-by-parts methods, which are compositional and structural in nature. Canonical or configural configurations of face parts were found to trigger greater response vs. randomly rearranged parts within the face outline in the amygdala, superior temporal sulcus (STS), and FFA [15]. Deficits in configural processing could account for prosopagnosia [16]. Face processing, however, is more than just configural. Face perception "engages a domain-specific system for processing both configural and part-based information about faces" [14]. This accommodates viewpoint or pose changes, occlusion and/or disguise, and temporal changes. Robust and steady part-or patch-based information can still identify a face despite missing and/or changed patches.

What about encoding for face recognition? "For stimuli such as faces, which are likely to be encountered by every member of the species, configural representations or [golden ratio] templates may be effective because the basic stimulus configuration is invariant across the environments in which individuals may live. Thus the predictability of species-specific stimuli may allow for the creation through evolution of complex pattern recognition systems. These systems are tuned at birth but remain plastic through development" [17]. What is the difference between object and face recognition? As recounted by Duchaine and Nakayama [16], "object recognition typically involves feature processing, but face recognition also involves holistic and configural processing. Holistic processing is characterized by the integration of facial information into a gestalt, whereas configural processing usually describe sensitivity to the precise spatial layout of the facial features." The development of specific mechanisms starts with external features for newborns, proceeds with internal features around eight weeks, and will continue with holistic and configural processing later on. Aspergers' syndrome is a mild form of autism characterized by an abnormally-sized amygdala. Patients are unable to recognize facial expressions, e.g., fear, and seem to analyze separate elements of a face more than the whole.

Evidence for the holistic face space comes from "the detrimental effects of manipulations that disrupt the holistic structure of the face but leave individual features intact" [18], e.g., scrambling of the face, misaligning the lower and upper halves of the face, and inverted faces. Moscovitch et al. [19] argue that only a vertical half is necessary to activate configural face processing and that holistic processing has access to enough information to fill in for missing parts. McKone et al. [18] have shown that holistic processing can operate in isolation from (local) feature-based identification. In particular, they have shown that holistic processing is called for during fine discrimination tasks (on upright but not inverted faces) when the local cues for identity are unreliable, e.g., faces lacking distinguishable features, heavy (structural) noise due to illumination, mismatch of orientation between gallery and probe, expression, and make-up. The corresponding configural/holistic and parts-based/constellation face recognition approaches appear to be complementary and should thus feed each other.

Recognition-by-Parts:

Recognition-by-parts came in response to image variability, in general, and pose changes, in particular. The holistic approach solution for coping with variability requires point correspondence using precise alignment. This is quite hard to be met in practice. One way around the correspondence problem for the holistic approach is to cluster the views and build a corresponding family of (view specific) classifiers indexed by pose. Recognition-by-parts can make processing and recognition easier because it does not seek for invariance. Instead, it handles variability using flexible geometric modeling and morphing to compensate for pose changes and possibly for limited occlusion and distortions. Representative of Recognition-by-parts are the related methods of Dynamic Link Architecture (DLA) and Elastic Graph Matching (EGM) [20, 21]. Elastic graph matching is a minimum distance classifier with respect to (a) scale space representation; and (b) some non-rigid string geometry connecting the nodes across the face. The string geometry is flexible enough to tolerate small changes in appearance, e.g., facial expressions, and to provide for limited invariance. Recall that the parts or nodes define a set of landmarks, e.g., the pupils, the corners of the mouth, the tip of the nose et al. The landmarks are coarsely represented using Gabor jets $J_i = a_i \cdot \exp(j\Phi_i)$ with amplitude $a_i(x)$, which vary slowly with position x, and phase $\Phi_i(x)$. Iterative matching seeks the minimum for an energy function S (J, J') that compares jets J and J' for amplitude preservation, on one side, and estimates the relative displacement of jets' locations, for geometry preservation, on the other side. Note that a phase sensitive similarity function can be included as well to further improve on localization accuracy. Minimizing the energy function is computationally expensive. An approximate solution, which decouples the above computation, is found in two stages [20]. Rigid matching, similar to template matching, first scores for jets' compatibility using local neighborhoods surrounding the jets' location x. The second stage stretches (in a non rigid fashion) the grid used for mapping the face using local perturbations in order to find ways to decrease the energy S. Orders of magnitude faster computation can be achieved using the power spectrum of the discrete wavelet transform (DWT) rather than Gabor jets [22].

Face recognition using EGM requires first to find the landmarks and place them in correspondence. To find the landmarks, one needs some general face representation that accounts for image variability due to age, gender and diversity among the subjects, e.g., human eyes can be shaped differently. Wiscott et al.[21], aware that "it would be too expensive to cover each feature combination by a separate graph," decided to "instead combine a representative set of individual model graphs into a stack-like structure, called a face bunch graph (FBG)" and proposed elastic bunch graph matching (EBGM). Each face model still enjoys the same grid structure like EGM but is now spanned by landmarks, represented using a bunch of jets and connected by springs or edges that take the average distance among them for value. "An eye bunch, for instance, may include jets from closed, open, female, and male eyes etc. to cover these local variations." The minimization of the energy function includes now also searching, independent of each other, for the best jets or local experts, among the bunch dedicated to each landmark. EGM and EBGM, lack when they assume that the jets are connected using similar strings disregarding the scale they were acquired at.

Component-based face recognition has been shown to outperform global/holistic methods [23]. Neuropsychological evidence, however, suggests that "face recognition based on configural (holistic) information can occur in isolation from recognition based on local feature cue [i.e., parts]. [Furthermore], local features provide insufficient information to ensure the accurate discrimination of identity and, thus, configural processing of the face is also necessary" [18]. The corollary is that the additional use of the whole face and its half sides for components can benefit the face Recognition-by-parts paradigm. Experimental evidence shown later on suggests, however, that the mix of parts and holistic (full face) configuration helps only with faces that do not experience occlusion and/or disguise. For the latter case, the standard Recognition-by-parts paradigm appears to work best. Another promising suggestion made is that compositional structure consists of coarse coding of shape fragments ("parts") and retinotopy ("geometry"), or equivalently that the parts' selective features encode for both shape ("what") and location ("where") [24]. The corollary here is that the face parts should record both representation and location across the face. The two corollaries are the conceptual driving force behind the currently described approach for face recognition-by-parts. Matching for both representation and location can be done using correlation filters. This is discussed in the next section.

Correlation Filters:

This section briefly reviews various but related correlation filters, beginning with the simple match filter (MF) and ending with the Optimal Trade-off Filter (OTF). The following convention on notation is followed: Vector b will be in lower case and bold, matrix B will be upper case bold, and scalar b will be in lower case. s refers to a training vector, n to additive noise, x to the test vector, d to the desired response vector, and h to the filter weight. $D_x$ refers to a matrix containing the power spectrum of x on the diagonal and zeros elsewhere, and $^H$ refers to the conjugate transpose.

Match Filter (MF)
Minimize $h^H h$
Subject to $s^H h = d$
Solution: $h = s(s^H s)^{-1} d$ MF may be optimum against white noise but it allows training with only one exemplar s. To train with multiple exemplars, one my use a Synthetic Discriminant Function filter:

Synthetic Discriminant Function (SDF) [25]
Minimize $h^H h$
Subject to $S^H h = d$ where $S = [s_1 \ldots s_M]$ and $d = 1_M$ (vector of M ones)
Solution: $h = S(S^H S)^{-1} d$ SDF is robust to white noise. Robustness to general non-white noise leads to the Minimum Variance Synthetic Discriminant Filter (MVSDF) described next Minimum Variance SDF [26]
Minimize $h^H Q_n h$
Subject to $S^H h = d$ where $S = [s_1 \ldots s_M]$ and $d = 1_M$
Solution: $h = Q_n^{-1} S(S^H Q_n^{-1} S)^{-1} d$ where $Q_n$ is defined as a diagonal matrix containing the average training noise power spectrum. When the noise power spectrum is not known, it is typically assumed to be spectrally white, $Q_n = \sigma n2I$, and the MVSDF filter reduces to the SDF filter. Like SDF and MF, MVSDF may suffer from the presence of sidelobes which are secondary peaks away from the true correlation peak on the correlation surface, even when training and testing with the same image. This problem may be addressed using the Minimum Average Correlation Energy (MACE) filter described next.

MACE Filter [27]
Minimize $h^H D_s h$
Subject to $S^H h = d$ where $S = [s_1 \ldots s_M]$ and $d = 1_M$
Solution: $h = D_s^{-1} S(S^H D_s^{-1} S)^{-1} d$ where $D_s$ is defined as a diagonal matrix containing the average training exemplars' power spectrum. The MACE filter minimizes the correlation sidelobes for the training images. However, it may be extremely sensitive to the noise that is typically present in the test image. To improve the MACE filter robustness to noise and distortion, the Optimal Trade-off filter (OTF) filter was developed and is described next Optimal Trade-off Filter [28]
Min $h^H D_s h$, $h^H Q_n h$
Subject to $S^H h = d$ where $S = [s_1 \ldots s_M]$ and $d = 1_M$
Solution: $h = T^{-1} S(S^H T^{-1} S)^{-1} d$ where $T = (\alpha D_s + \sqrt{1-\alpha^2} Q_n)$. OTF was designed to trade off, using $\alpha$, between correlation sidelobe suppression and noise robustness. $\alpha = 1$ leads to the MACE filter (maximum sidelobe suppression), while $\alpha = 0$ yields the MVSDF filter (maximum noise robustness). $\alpha = 0$ with white the noise assumption yields the SDF filter. OTF has been used on face verification [29].

Correlation Filters for Recognition-by-Parts:

The correlation filters (CF) discussed in the preceding section may be suitable for implementing Recognition-by-parts using template matching. The strength of the correlation peak indicates how well the training and test images match, while the location of the peaks indicates the relative shift between the training and test images. Recognition-by-parts involves matching the corresponding parts and the relative location of these parts. One has to maintain the relative locations of the parts during training and testing in order to check for their alignment. This is easily accomplished by using masks that expose only the relevant part(s) and zero out the rest of the face. Several examples used to illustrate the possible use of correlation filters for Recognition-by-parts are shown below.

FIG. 1A shows three masks (112, 114 and 116) applied to a training face 110 to extract out the face parts corresponding to the right eye (RE), left eye (LE), and nose (N), with the area outside the mask zeroed out. As shown, the masks consist of boxes that surround the training face parts as shown in FIG. 1A. However, one skilled in the art will recognize that the masks may be many other shapes. In particular, the shapes may be adapted to the shape of the face part of interest. The three face parts are used to design three match filters (MF) that are used for recognition-by-parts. FIG. 1B shows the three masks (112, 114 and 116) applied to a test image face 120 of the same subject. FIG. 1C shows correlation peaks for the same subject using the match filters. The matching scores (correlation peaks shown in FIG. 1C) for the face components are high and the peak locations are aligned.

Figure 2B:
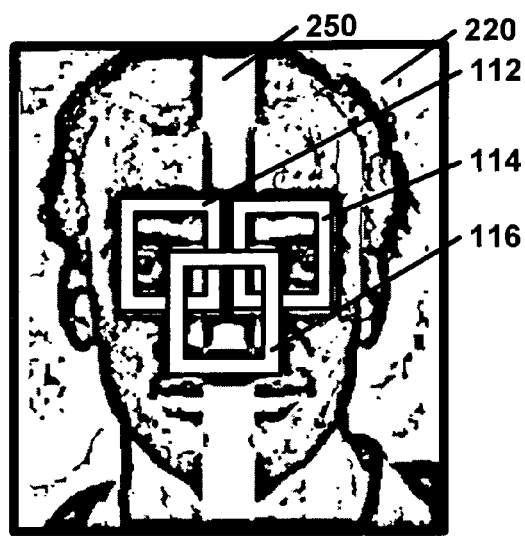
FIG. 2B shows three masks applied to an distorted test face image as per an aspect of an embodiment of the present invention.
Figure 2C:
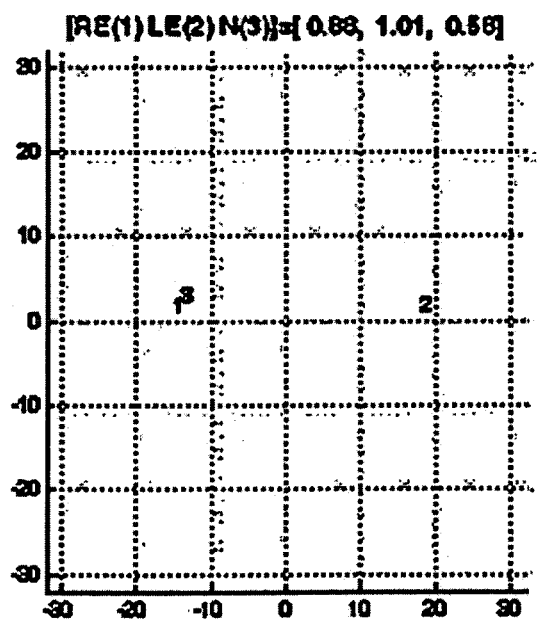
FIG. 2C shows correlation peaks for the face images shown in FIG. 2A and FIG. 2B using match filters as per an aspect of an embodiment of the present invention.

The next example (see FIG. 2A, FIG. 2B and FIG. 2C) illustrates the case of parts that match but miss proper alignment. The training image 210 and the test image 220 come from the same subject. The test image 220 has been artificially cut at the middle and pulled apart (see 250) so that the interocular distance has increased and the nose is now split. FIG. 2C shows correlation peaks for the training image 110 and test image 220 using the match filters derived using training image 210. The match filters shows a good match for the eye components, a poor match for the corresponding nose component, and the peak locations for the eye components do not align. Hence, the authentication fails.

Figure 3A:
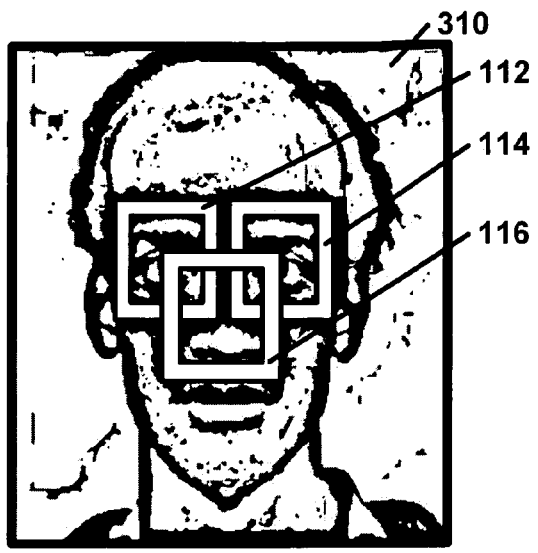
FIG. 3A shows three masks applied to a training face as per an aspect of an embodiment of the present invention.
Figure 3B:
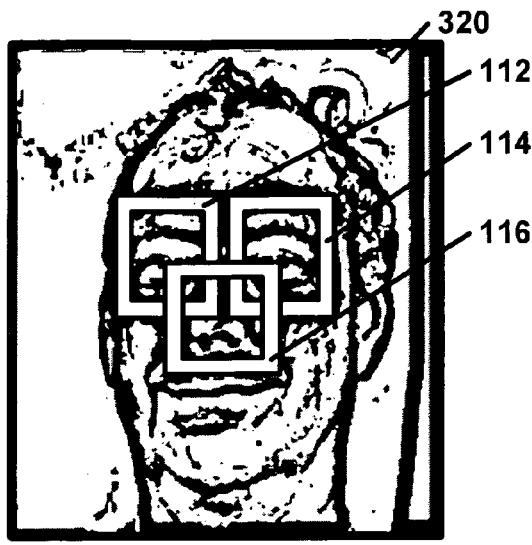
FIG. 3B shows three masks applied to a test face image for a different subject then used in FIG. 3A as per an aspect of an embodiment of the present invention.
Figure 3C:
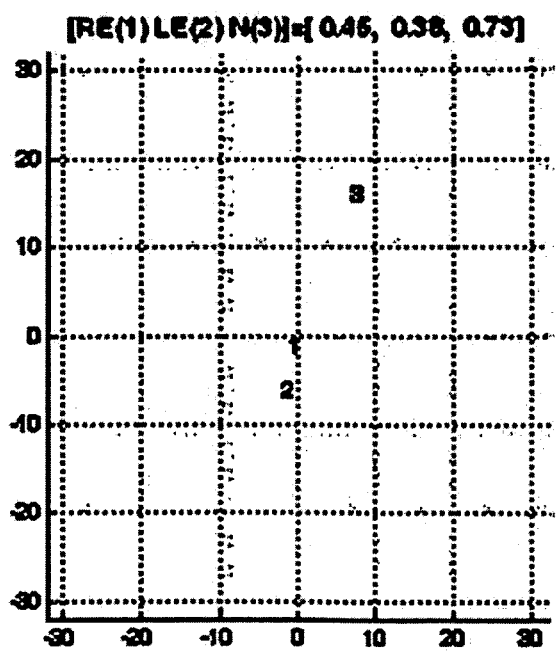
FIG. 3C shows correlation peaks for the face images shown in FIG. 3A and FIG. 3B using match filters as per an aspect of an embodiment of the present invention.

The last example illustrates the case for different subjects (see FIG. 3A, FIG. 3B and FIG. 3C). The training image 310 and the test image 320 come from different subjects. FIG. 3C shows correlation peaks for the training image 310 and test image 320 using match filters derived using training image 310. The peaks from the MF are weak and misaligned, and authentication fails.

Adaptive and Robust Correlation Filters (ARCF):

The correlation filters described so far do not take advantage of the information provided by the test data, e.g., noise and distortions, in the design of the filter. Similar to beamforming [30], the correlation filter should be designed such that it can adapt and automatically tune out the actual noise/distortion from test data without making any arbitrary assumptions about the structure of the noise. This would result in an adaptive correlation filter whose output correlation surface has an optimally low average sidelobe level. The correlation peak, however, may still be sensitive to noise/distortion. To make the correlation peak robust to noise/distortion, an adjustable loading parameter may be introduced that can be derived using an approach motivated by beamforming or Tikhonov regularization. The loading parameter, based on the magnitude of the match filter weight, provides for the robust filter sought after.

The rationale for the two pronged optimization can be explained as follows. The overall optimization should minimize the average sidelobe so that the correlation peak (vs. sidelobes) will stand out for matching to occur. The optimization, however, should also have deleterious effects on the correlation peak if the (face) parts are slightly mismatched due to small additive noise and/or structural (face) distortions. To cope with noise, either additive or structural, one may also need to optimize the overall filter design in order to make it robust against such noise. The optimization of the correlation peak, which corresponds to minimizing the sidelobes, can, however, interfere with the search for robustness against noise. More robustness should make the average sidelobe become larger and the correlation peak stands out less. A relevant trade-off is that the average sidelobe level will not reach minimum when one simultaneously seeks robustness against noise. The adaptive aspect of ARCF refers to the use of test data in addition to training data in the calculation of the filter. The filter can be said to "adapt" or to adjust itself based on the test data presented to it in order to minimize the average output sidelobe level. The robustness aspect refers to the ability to prevent small mismatches from significantly reducing the strength of the correlation peak. Adaptation and robustness work together to maximize the peak to sidelobe ratio for better detection. This is similar to the use of labeled and unlabeled samples by semi-supervised learning.

Adaptiveness. If the noise/distortion in the test data can be measured, then it can be minimized directly. This approach has been used by both MVSDF and OTF when $Q_n$, the noise power spectrum or covariance, is known. When $Q_n$ is not known, it may be assumed to be white. The embodiments take a different approach. They are configured to learn the noise/changes observed in the test data and to automatically adjust the correlation filter in order to minimize its response. This is accomplished by minimizing the output correlation energy due to test data while maintaining a unit response to unit training data.

Minimize $h^H D_x h$

Subject to $S^H h = d$ where $S = [s_1 \ldots s_M]$ and $d = 1_M$ where $D_x$ is a diagonal matrix containing the power spectrum of the test exemplar. The (still non-robust) Adaptive Correlation Filter (ACF) solution, $h = D_x^{-1} S (S^H D_x^{-1} S)^{-1} d$, is similar to the MACE filter, except that $D_s$ is now replaced by $D_x$. The use of test data $D_x$, in addition to training data $S$, in the design of the filter, is different from previous approaches to correlation filter design, and has proved beneficial. The filter tunes itself to the "noise" present in the test data in order to reject it. The output correlation surface has an optimally low sidelobe level, irrespective of the actual structure of the noise. This is different from MACE, which lacks an optimization criterion to reject the noise from test data. It is also different from MVSDF and OTF where the noise information $Q_n$ must be known or has to be assumed to be white even when the actual noise/distortion is not.

Robustness. A robust correlation filter should produce a stable correlation peak that changes very little even when there is a large change in the strength of the distortion/noise. To minimize the sensitivity of the correlation peak to the noise/distortion level, one may minimize the rate of change of the squared correlation peak with respect to the strength of the noise/distortion that is present. Let the squared correlation peak be $p = E\{|h^H x|^2\}$ $$p = E\{h^H x x^H h\} = E\{h^H (s+n)(s+n)^H h\} = E\{h^H (ss^H + sn^H + ns^H + nn^H) h\} = h^H ss^H h + h^H E\{sn^H + ns^H + nn^H\} h = h^H ss^H h + h^H Q h = h^H ss^H h + \xi h^H N h$$

where the covariance $N$ is normalized so that the average of the diagonal elements is 1, and $\xi$ is the strength parameter. We seek to minimize $dp/d\xi = h^H N h$. When the noise/distortion is not known, it is typically assumed to be white, $N = I$. The ARCF formulation then becomes Minimize the output correlation energy $h^H D_x h$ Subject to unit response to training signal $S^H h = d$ Subject to sensitivity constraint $h^H I h \leq \alpha$ The solution found is $h = (D_x + \epsilon I)^{-1} S [S^H (D_x + \epsilon I)^{-1} S]^{-1} d$ and one chooses $\epsilon$ to satisfy the constraint $h^H I h \leq \alpha$ (see Appendix for the derivation). The solution for $\epsilon = 0$ is $h = D_x^{-1} S [S^H D_x^{-1} S]^{-1} d$. It has the same form as the MACE filter, which is also sensitive to noise and distortion. The solution $h = S[S^H S]^{-1} d$ is found when $\epsilon = \infty$. This is the same as the SDF filter and the correlation peak has maximum robustness to white noise. The magnitude of the SDF weight is the smallest among the adaptive correlation filters with white noise robustness. Thus $c$ may be chosen to satisfies the constraint $h^H h \leq k |h_{SDF}|^2$ where $k \geq 1$.

Tikhonov Regularization. The derivation of ARCF can be also done using Tikhonov regularization. Suppose some objective function $f(h)$ that has to be minimized is very flat, which would make it difficult to find its minimum. Tikhonov regularization finds an approximate minimum by adding a quadratic term to force the new objective function to be strongly convex so that it has a unique solution. Instead of minimizing $f(h)$, one minimizes now $f(h) + \epsilon |h|^2$. ARCF can be then derived using Tikhonov regularization as shown next. The objective function $f(h) = h^H D_x h$ may not have a unique minimum when $D_x$ is ill-conditioned. One then adds the quadratic term $\epsilon h^H h$ to make the new objective function $h^H D_x h + \epsilon h^H h = h^H(D_x + \epsilon I)h$ strongly convex so it has a unique solution. $\epsilon$ is a positive number that controls the degree of regularization. This formulation for ARCF using Tikhonov regularization yields the same solution as the one derived earlier.

Figure 4A:
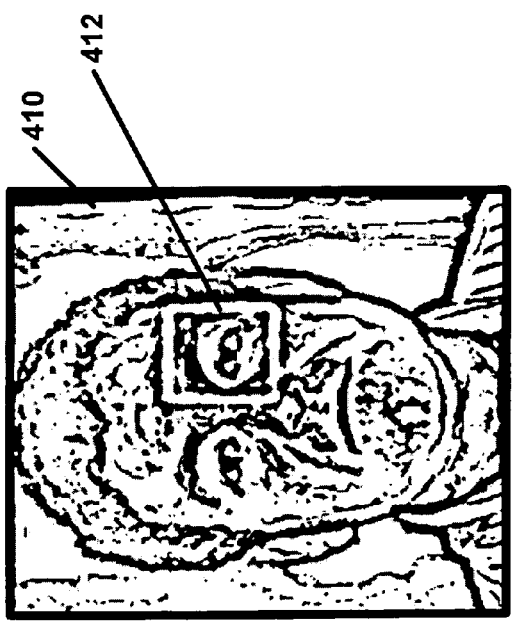
FIG. 4A shows a right eye mask applied to a training face as per an aspect of an embodiment of the present invention.
Figure 4B:
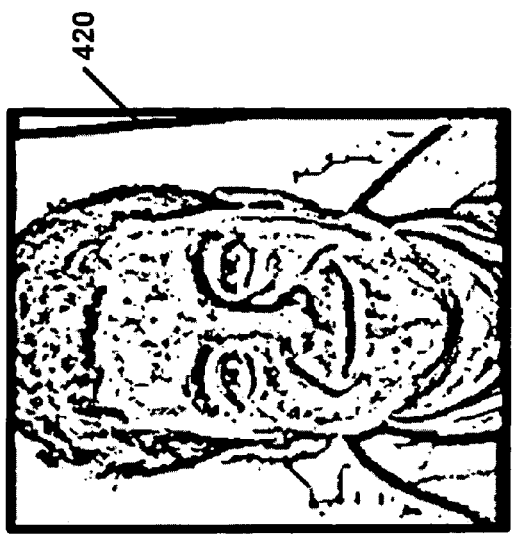
FIG. 4B shows a test image as per an aspect of an embodiment of the present invention.
Figure 4C:
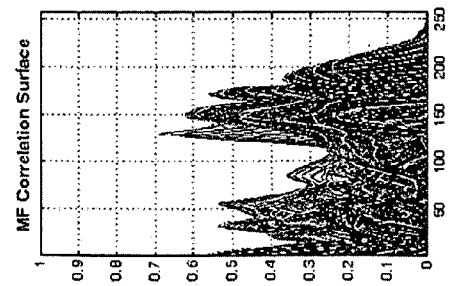
FIG. 4C shows correlation peaks associated with the use an MF filter on the images shown in FIG. 4A and FIG. 4B as per an aspect of an embodiment of the present invention.
Figure 4D:
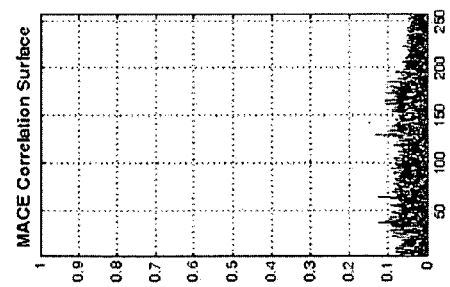
FIG. 4D shows correlation peaks associated with the use a MACE filter on the images shown in FIG. 4A and FIG. 4B as per an aspect of an embodiment of the present invention.
Figure 4E:
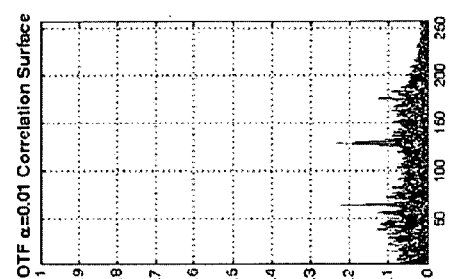
FIG. 4E shows correlation peaks associated with the use an OTF filter on the images shown in FIG. 4A and FIG. 4B as per an aspect of an embodiment of the present invention.
Figure 4F:
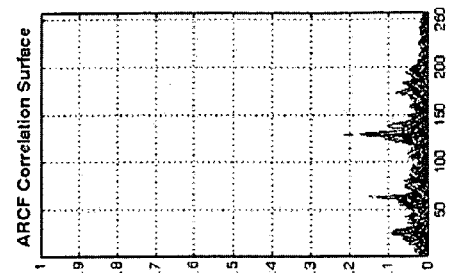
FIG. 4F shows correlation peaks associated with the use an ARCF filter on the images shown in FIG. 4A and FIG. 4B as per an aspect of an embodiment of the present invention.

Minimize the output correlation energy $h^H(D_x + \epsilon I)h$
Subject to unit response to training signal $S^H h = d$
Solution $h = (D_x + \epsilon I)^{-1} S[S^H(D_x + \epsilon I)^{-1} S]^{-1} d$ FIGS. 4A through 4D show how different correlation filters compare in matching the left eye component for both representation and location. FIG. 4A shows a right eye mask 412 applied to a training face 410 and FIG. 4B shows a test image 420. FIG. 4C shows correlation peaks associated with the use an MF filter on the images shown in FIG. 4A and FIG. 4B. FIG. 4D shows correlation peaks associated with the use a MACE filter on the images shown in FIG. 4A and FIG. 4B. FIG. 4E shows correlation peaks associated with the use an OTF filter on the images shown in FIG. 4A and FIG. 4B. FIG. 4F shows correlation peaks associated with the use an ARCF filter on the images shown in FIG. 4A and FIG. 4B.

Figure 5A:
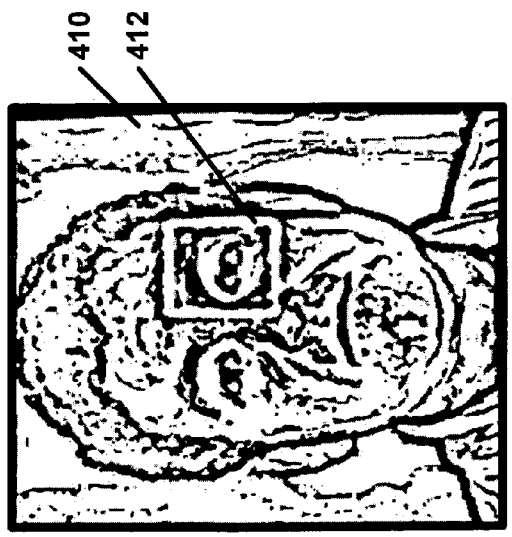
FIG. 5A shows a right eye mask applied to a training face as per an aspect of an embodiment of the present invention.
Figure 5B:
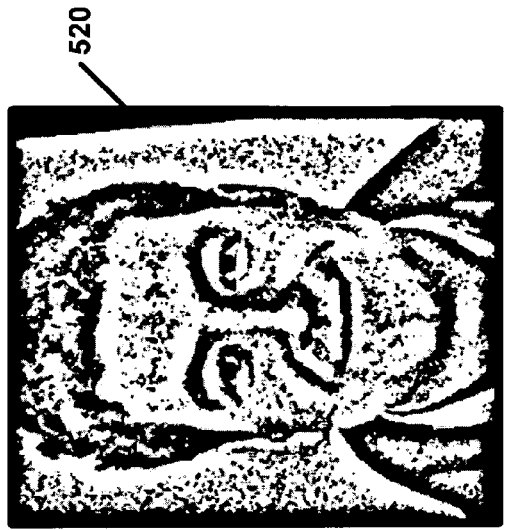
FIG. 5B shows a test image with noise added as per an aspect of an embodiment of the present invention.
Figure 5C:
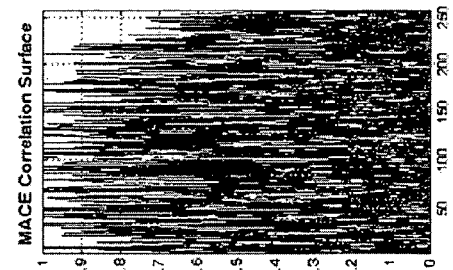
FIG. 5C shows correlation peaks associated with the use an MF filter on the images shown in FIG. 5A, FIG. 5B as per an aspect of an embodiment of the present invention.
Figure 5D:
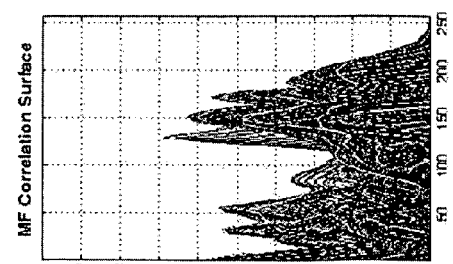
FIG. 5D shows correlation peaks associated with the use a MACE filter on the images shown in FIG. 5A, FIG. 5B as per an aspect of an embodiment of the present invention.
Figure 5E:
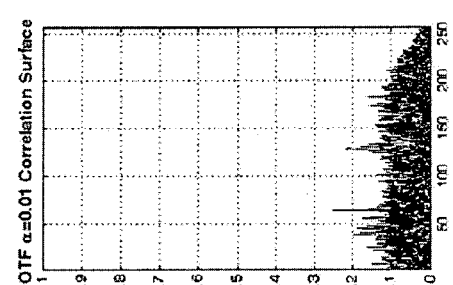
FIG. 5E shows correlation peaks associated with the use an OTF filter on the images shown in FIG. 5A, FIG. 5B as per an aspect of an embodiment of the present invention.
Figure 5F:
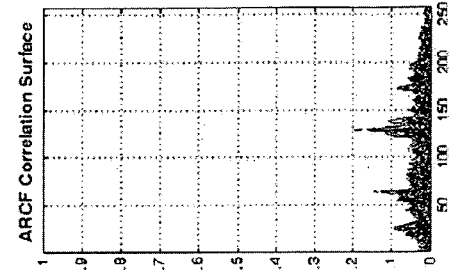
FIG. 5F shows correlation peaks associated with the use an ARCF filter on the images shown in FIG. 5A, FIG. 5B as per an aspect of an embodiment of the present invention.

One can see that ARCF outscores MF, MACE, and OTF in terms of discriminating between the true peak corresponding to the left eye and the false peak caused by the right eye. FIG. 5C, FIG. 5D, FIG. 5E and FIG. 5F show correlation peaks associated with the use of an MF filter, Mace filter, OTF filter and ARCF filter respectively to images shown in FIG. 5A and FIG. 5B. FIG. 5A is the same as FIG. 4A and FIG. 5B is a version FIG. 4B with noise added. Note that ARCF displays the lowest average sidelobe, which indicates its robustness to noise. The advantage of ARCF over the competing correlation filters become even more pronounced when noise is added. The false peak for OTF shows now as the strongest.

Matching the left eye component against the whole face using various correlation filters. The true peak is at the center of the horizontal axis. Note that the MF has the strongest true peak, but it also has significant false peaks. The MACE correlation peak is sensitive to distortion and is barely visible. OTF has a good true peak but also an equally strong false peak. Of the four correlation filters, only ARCF shows the largest separation between the true peak and the much weaker false peak, and has the lowest average sidelobe level.

Figure 6:
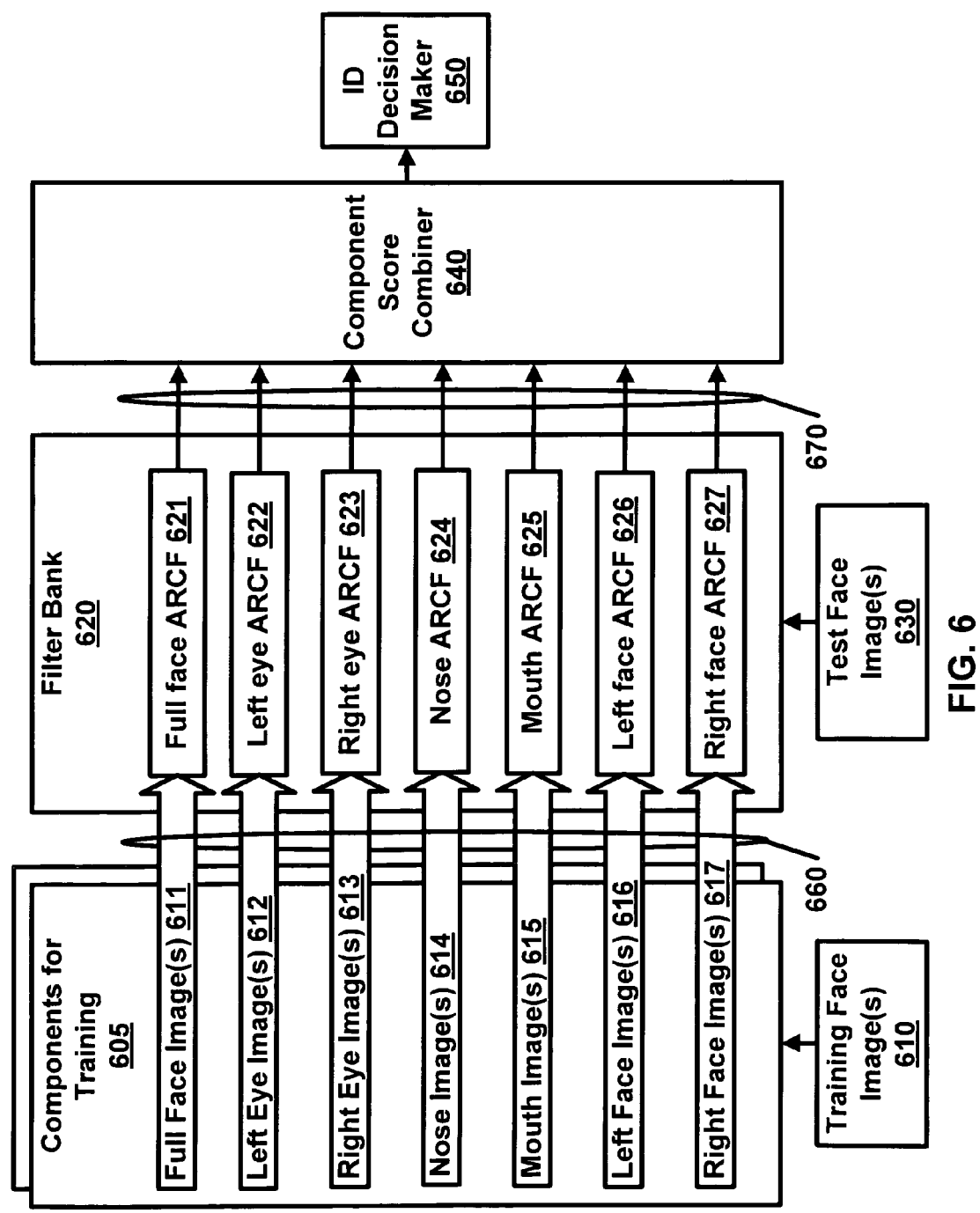
FIG. 6 is a block diagram of a face recognition system as per an aspect of an embodiment of the present invention.

Architecture:

The architecture for face Recognition-by-parts is shown in FIG. 6. The components for training 605 consist of face part training images (611, 612, 613, 614, 615, 616 and 617) for an enrolled client and their counterparts drawn from test data 630 sharing the same identity are combined on a part-by-part basis to build the corresponding ARCF filters (621, 622, 623, 624, 625, 636 and 627) in the filter bank 620. The outputs 670 from ARCF may be combined using a technique such as Linear Discriminate Analysis (LDA) to learn the optimal (separation) boundary hyper-plane. The ARCF outputs 670 may be projected on the direction axis in order to find the overall authentication score. The receiver operating curve (ROC) at force acceptance rate (FAR) equal to 1% using the overall scores from both authentic claims and impostors determines the optimal decision threshold that will be used on future authentication claims. In particular, it was found that for the purpose of generalization it is feasible to learn the optimal LDA direction and the decision threshold from one population [31], and use them on a different population, e.g., AR face database[32].

Preprocessing. Faces may be rotated and scaled for the eye centers to align. A common full-face mask may be applied to the image to extract the full face. The face may be normalized by its mean and standard deviation to have zero mean and unit variance. A mean face may be computed from the whole population available for training. The final preprocessed face may be the normalized face less the mean face.

Face Parts: Recognition-by-parts may require defining and modeling the face components 605 involved. A single but complete training face image 610 yields multiple face parts (611, 612, 613, 614, 615, 616 and 617) by applying different masks to expose only the important face components. The example architecture shown in FIG. 6 makes use of seven face parts that correspond to the left eye 612, right eye 613, nose 614, mouth 615, left half-face 616, right half-face 617, and the full face without the hair 611. The relative location of these parts (611, 612, 613, 614, 615, 616 and 617) is maintained within the mask such that their overlay would reconstruct the original whole face. When the face parts are perfectly correlated with the original whole face the components come from, the correlation peaks should align at a single point in the correlation surface. The strength of the correlation peaks should indicate how well the trained face components match those found for the test image 630. Tight clustering of the locations for these correlation peaks should indicate that the relative configuration of the face components found on the test image matches that of the training (gallery) face(s) 610.

ARCF Filter Bank 620

The face model consists of a collection of ARCF filters (621, 622, 623, 624, 625, 626 and 627), one for each face part (611, 612, 613, 614, 615, 616 and 617). Each ARCF filter (621, 622, 623, 624, 625, 626 and 627) corresponds to one of the face parts (611, 612, 613, 614, 615, 616 and 617) and is derived using both the training/enrolled face image(s) 610 and the corresponding part from the test face image(s) 630. Multiple training (from the same client) and/or test faces are allowed. A face image vector 660 (shown in FIG. 7) may be input to the ARCF filter bank 620 and can contain the face part images (611, 612, 613, 614, 615, 616 and 617).

Figure 8:
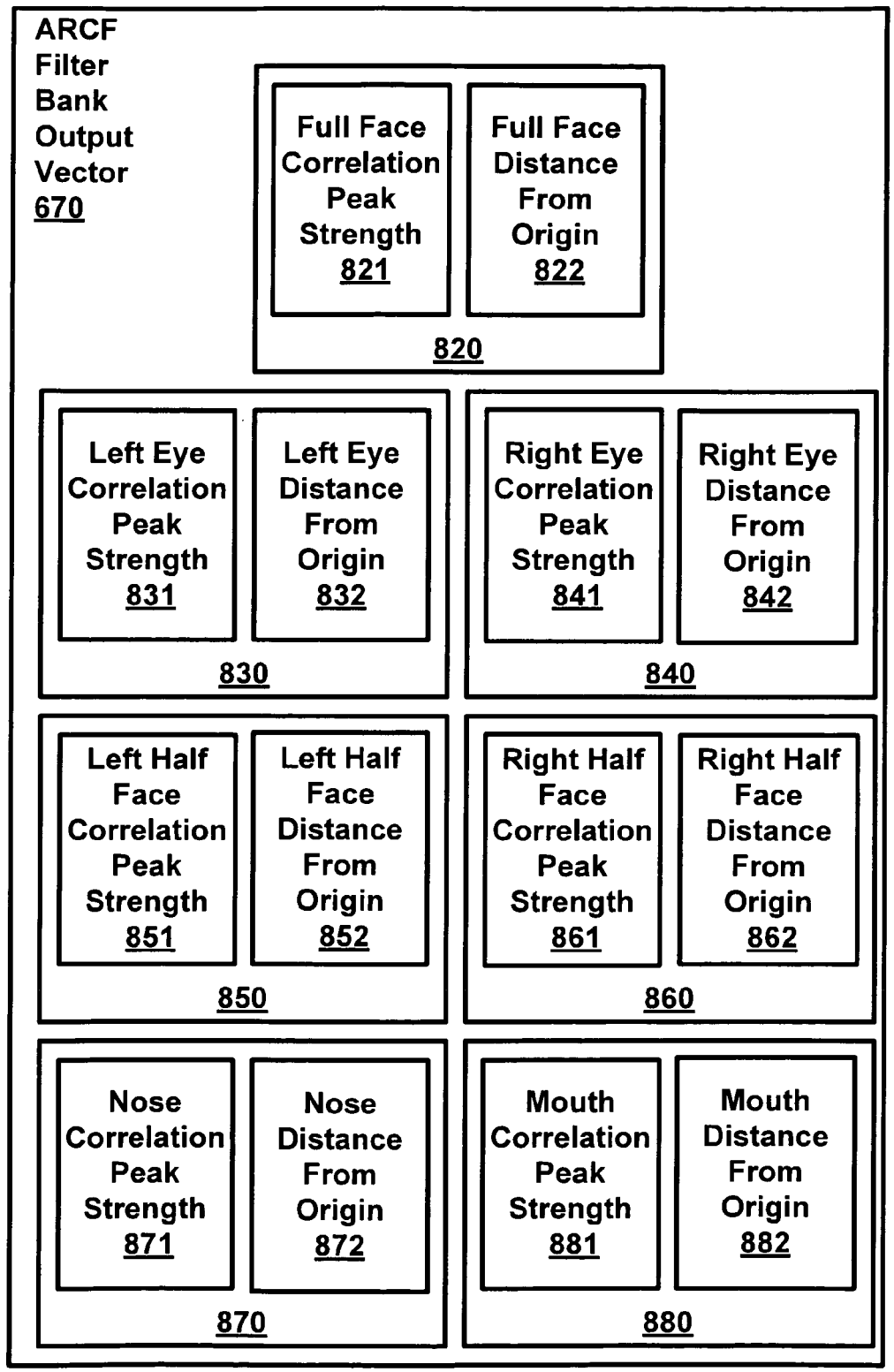
FIG. 8 is a block diagram of a filter bank output vector as per an aspect of an embodiment of the present invention.

The output 670 (shown in FIG. 8) of the ARCF filter bank 620 may be a vector containing the correlation peak strengths and their distances from the origin for each of the face parts. The vector consists of 14 components corresponding to the 7 correlation peaks' strength and 7 distances. As illustrated in this face recognition example, the full face image 820 includes a full face correlation peak strength 821 and a full face distance form origin 822 data, the left eye image 830 includes a left eye correlation peak strength 831 and a left eye distance form origin 832 data, the right eye image 840 includes a right eye correlation peak strength 841 and a right eye distance form origin 842 data, the left half face image 850 includes a left half face correlation peak strength 851 and a left half face distance form origin 852 data, the right half face image 860 includes a right half face correlation peak strength 861 and a right half face distance form origin 862 data, the nose image 870 includes a nose correlation peak strength 871 and a nose distance form origin 872 data, the mouth image 880 includes a mouth correlation peak strength 881 and a mouth distance form origin 882 data. The distance information is used to enforce location matching and eliminate false peaks. A peak whose distance exceeds the (empirically validated) threshold may be considered a false peak and have its peak strength zeroed out. By having a bank of ARCF filters 620 where each filter (621, 622, 623, 624, 625, 626 and 627) is trained on a single face component 605, instead of a single ARCF filter trained on all seven face components, the intermediate outputs (621, 622, 623, 624, 625, 626 and 627) for each face part can be monitored and analyzed before they are combined. Furthermore, these intermediate outputs can be combined non-linearly rather than linearly in order to exploit face symmetry as described below.

Combination of ARCF Outputs 640 and Decision Stage 650

Face symmetry may be exploited using non-linear processing of the individual correlation peaks. For symmetric face components such as the left and right eyes, or the left and right half faces, we use their dominant correlation peak. We compute three similarity scores for full-face (F), half-faces (H), and face parts (P). F is the peak strength for the full-face, H is the dominant peak strength among the left and right half-faces, while P is a linear combination of [max (left eye, right eye), nose, mouth] using the weight w derived using LDA on FERET. One finds was the optimal projection that separates the authentic class from the imposter class. The relative weights of the test components present are unchanged after weighting and any missing component (peak=0) will not reduce P. The thresholds for the three similarity scores [F, H, P] were determined from ROC using FERET (training database) at FAR=1% to be [0.16, 0.2, 0.26]. The result of the component score combiner 640 may be passed to an ID decision maker 650. The ID decision maker may use the combined scores to decide if the images match. For example, the ID decision maker 650 may decide that authentication succeeds when any one of the three similarity scores is above its corresponding threshold.

Figure 7:
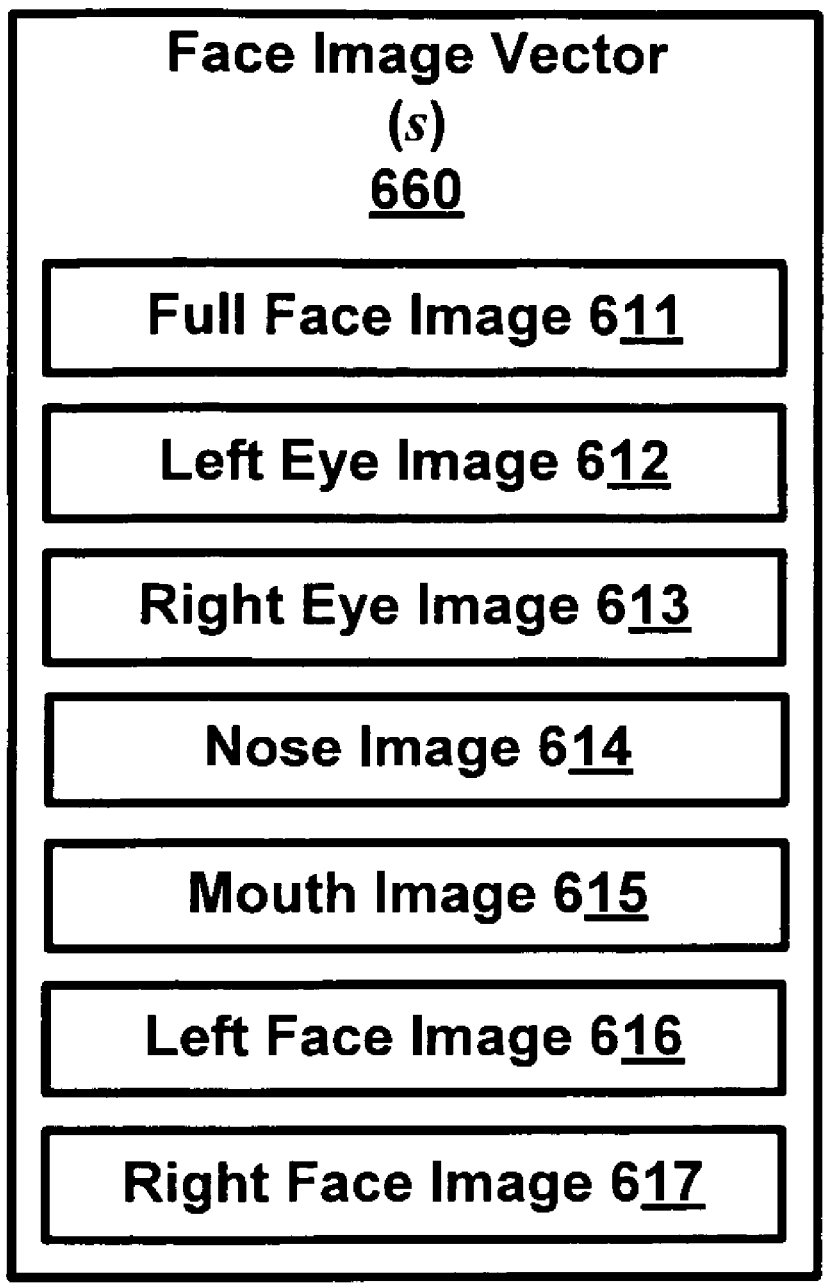
FIG. 7 is a block diagram of a face image vector as per an aspect of an embodiment of the present invention.
Figure 9:
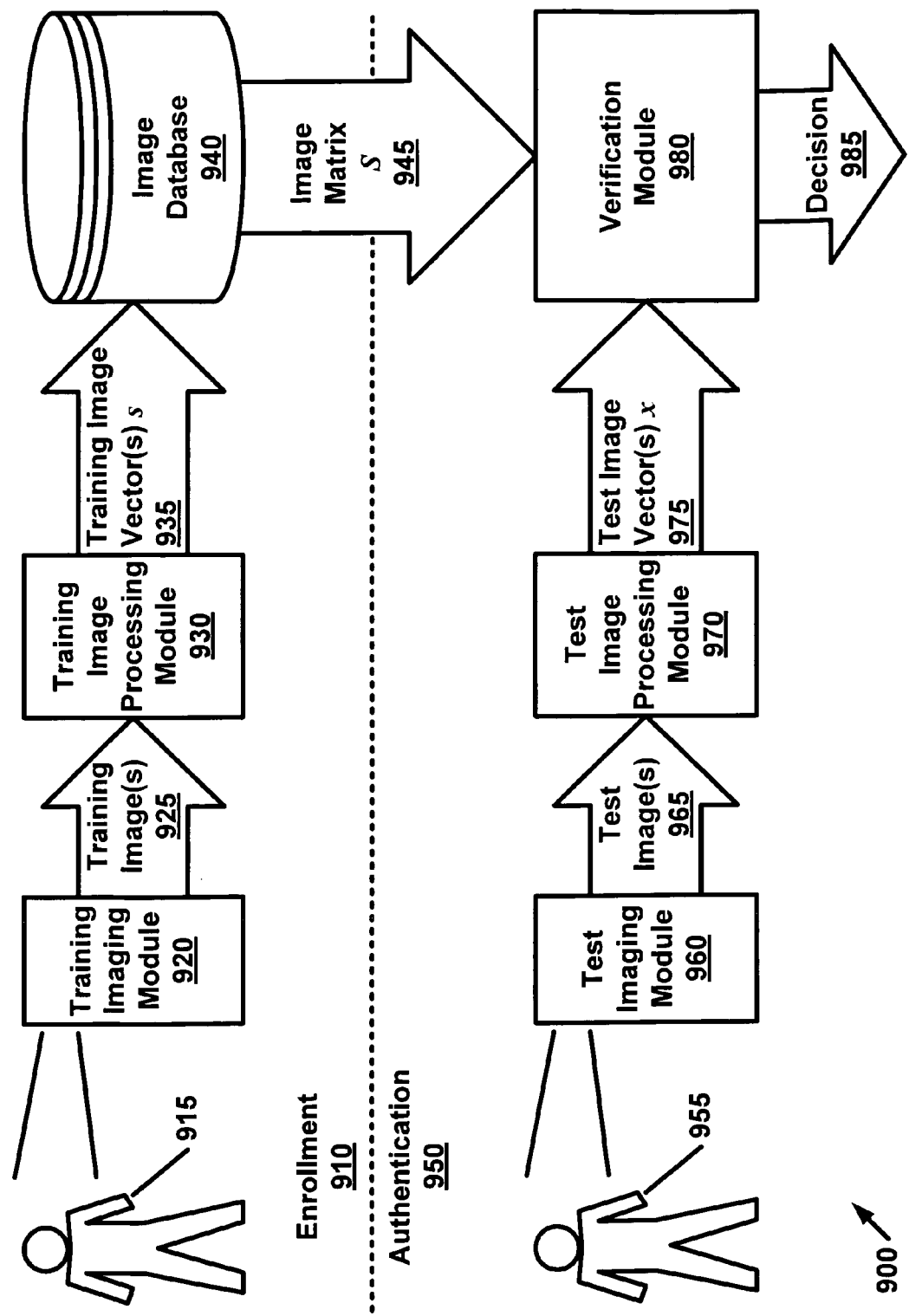
FIG. 9 is a block diagram of an enrollment and authentication as per an aspect of an embodiment of the present invention.

FIG. 9 is a block diagram enrollment and authentication as per an aspect of embodiment(s) of the present invention. The recognition-by-parts authentication system 900 is configured to determine if a physical test target 955 represented in at least one test image 965 obtained using an imaging device 960 matches a physical training target 915 represented in at least one training image 925 that may also have been obtained using an imaging module. The top half of FIG. 7 illustrates a possible embodiment for enrollment 910 of the physical training target 915 and includes a training imaging module 920 used to generate training image(s) 925, a training image processing module 930 configured to convert the training image(s) 925 into training image vector(s) 935, and an image database 940 configured to store the training image vector(s) 935 such that an image matrix 945 may be derived for use by an authentication half of the recognition-by-parts system. The lower half of FIG. 7 illustrates a possible embodiment for authentication 950 of the physical test target 955 and includes a test imaging module 960 used to generate test image(s) 965, a test image processing module 970 configured to convert the test image(s) 965 into test image vector(s) 975, and a verification module 980 configured to generate a match decision using the test image vector(s) 975 and image matrix 945.

Imaging modules 920 and 960 should be able to create an electronic representation of physical target(s) 915 and 955. They may be same device or separate devices. Examples of an imaging module 920 or 960 includes but is not limited to: a digital camera; a camcorder; a scanner; a screen capture utility; a video capture device; a computer; a radio frequency imaging device such as a radar, an MRI; a sonar; or a combination thereof. The imaging module may use multiple imaging devices to create the electronic representation of physical target(s) 915 and 955. The physical target(s) 915 and 955 may include any kind of physical object such as a human face, an automobile, a tank, an animal, a building, a terrain, or the like.

Figure 10:
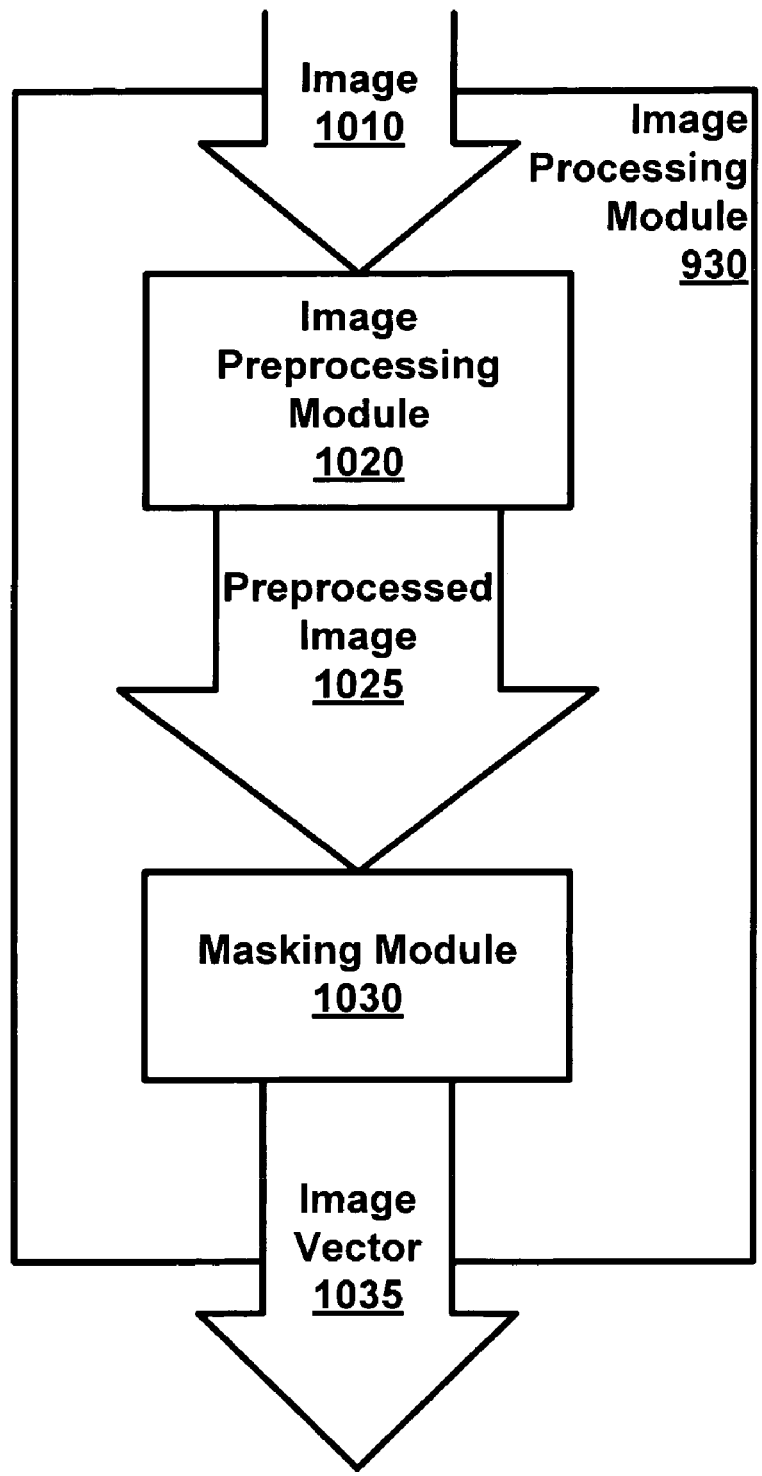
FIG. 10 is a block diagram of an image processing module as per an aspect of an embodiment of the present invention.
Figure 11:
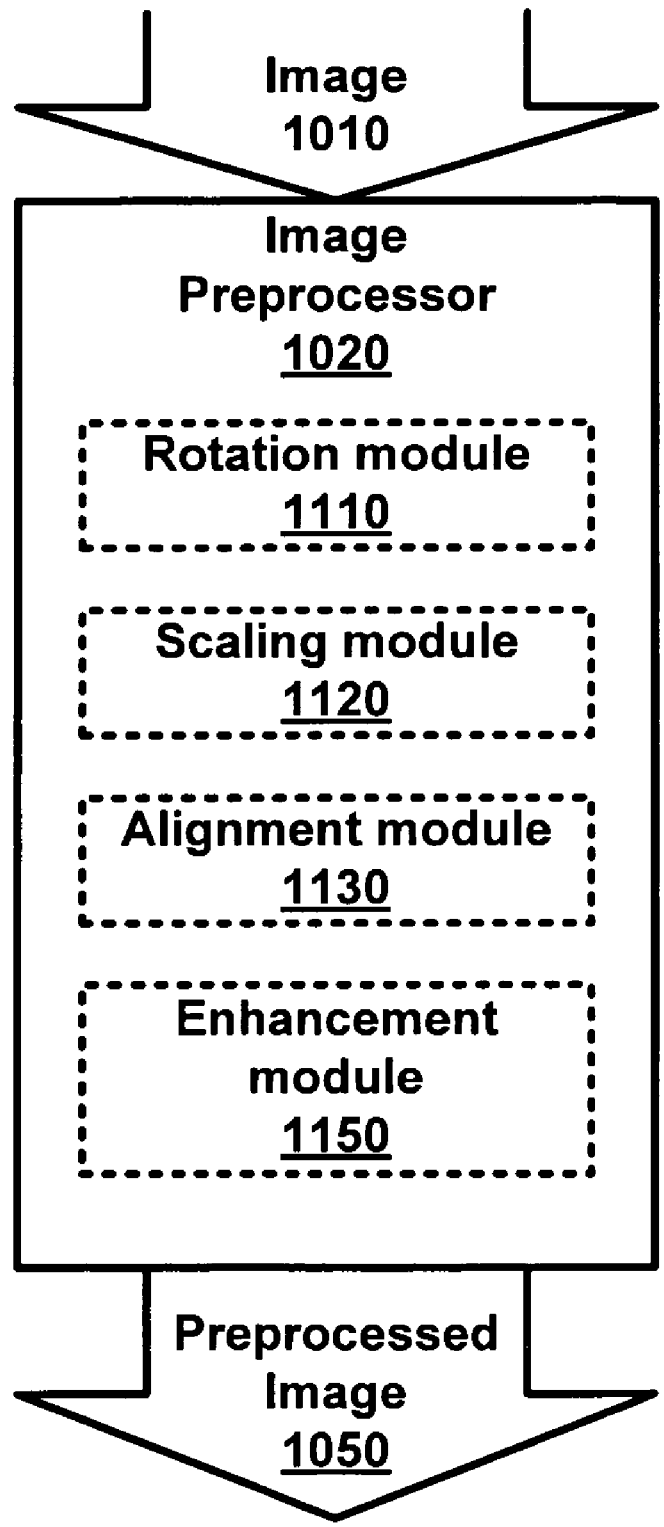
FIG. 11 is a block diagram of an image preprocessor as per an aspect of an embodiment of the present invention.
Figure 12:
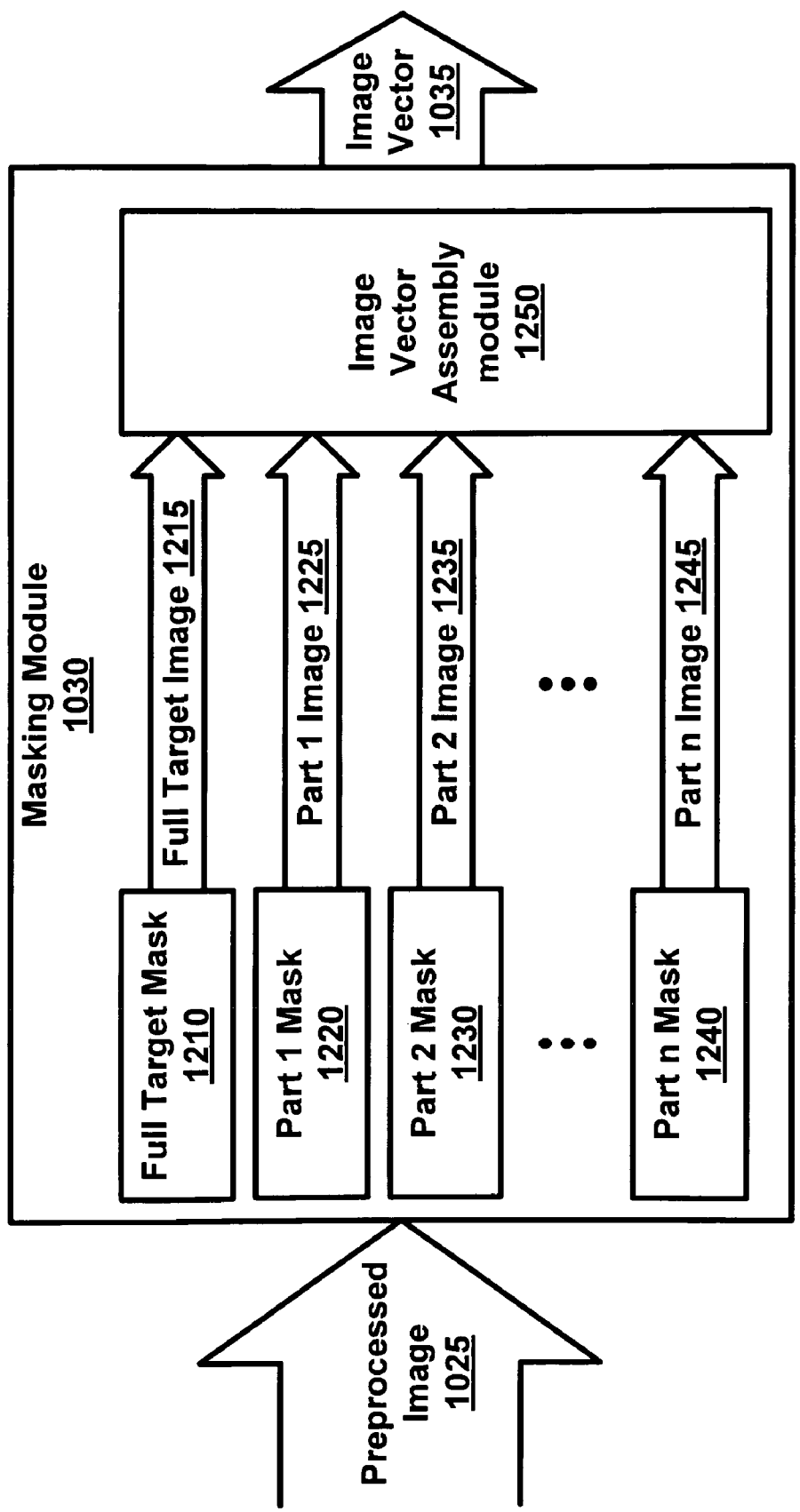
FIG. 12 is a block diagram of a masking module as per an aspect of an embodiment of the present invention.

FIG. 10 is a block diagram of an image processing module 930 as per an aspect of an embodiment of the present invention. As illustrated, the image processing module 930 includes an image preprocessing module 1020 and a masking module 1030. The image preprocessing module is further expanded in FIG. 11. As illustrated, the image preprocessing module 1020 includes an rotation module 1110, a scaling module 1120, an alignment module 1130, and an enhancement module 1150. The purpose of these modules 1110, 1120, 1130 and 1150 is make images 1010 as similar as possible with regard to a target represented in the image 1010. Therefore, these modules 1110, 1120, 1130 and 1150 may be configured (when possible or feasible) to operate as closely as possible to that part of the image 1010 that includes the target. The enhancement module may include normalize the image using information about other images that may be used in the recognition-by-parts system 900. It is envisioned that embodiments may use customized versions of modules 1110, 1120, 1130 and/or 1150 as needed. Some embodiments may include additional processing modules to handle special circumstances such as infrared or radar images.

Figure 13A:
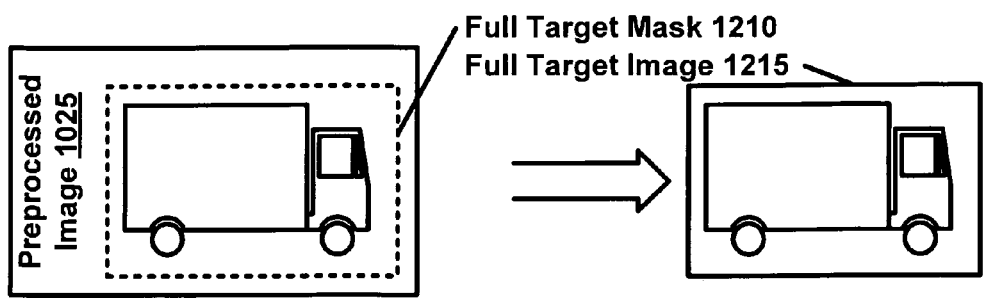
FIG. 13 is a block diagram of an example of a preprocessed image of a truck being processed by the masking module illustrated in FIG. 11 as per an aspect of an embodiment of the present invention.
Figure 13B:
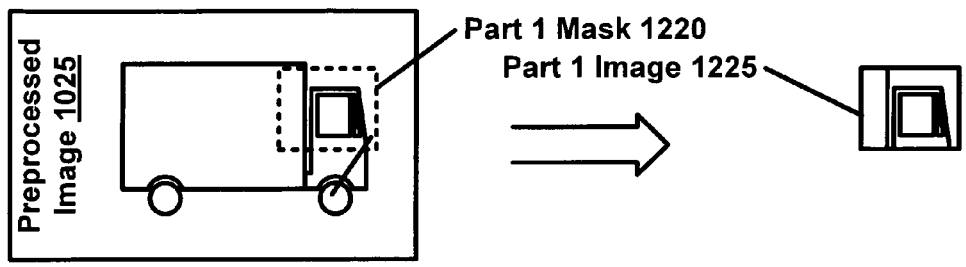
Figure 13C:
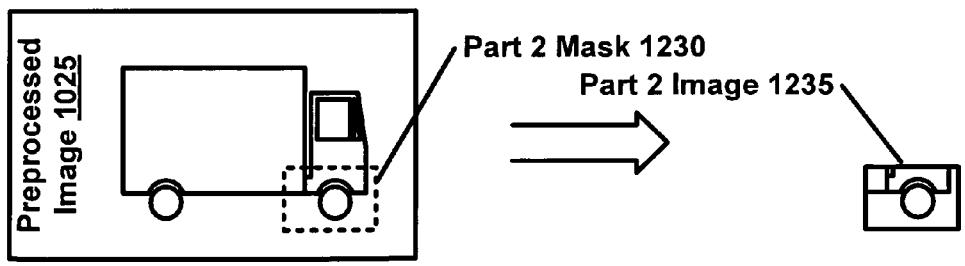
Figure 13D:
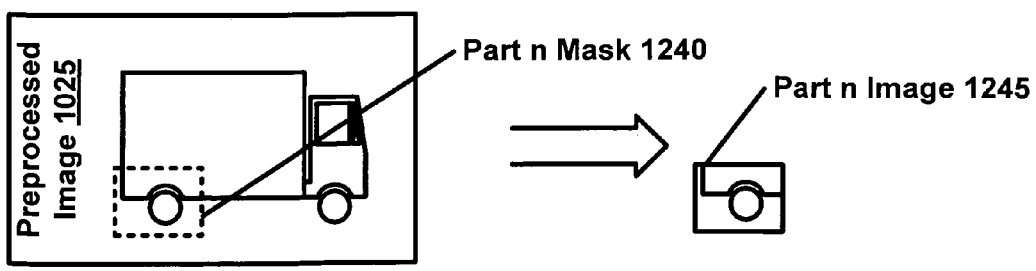
Figure 14:
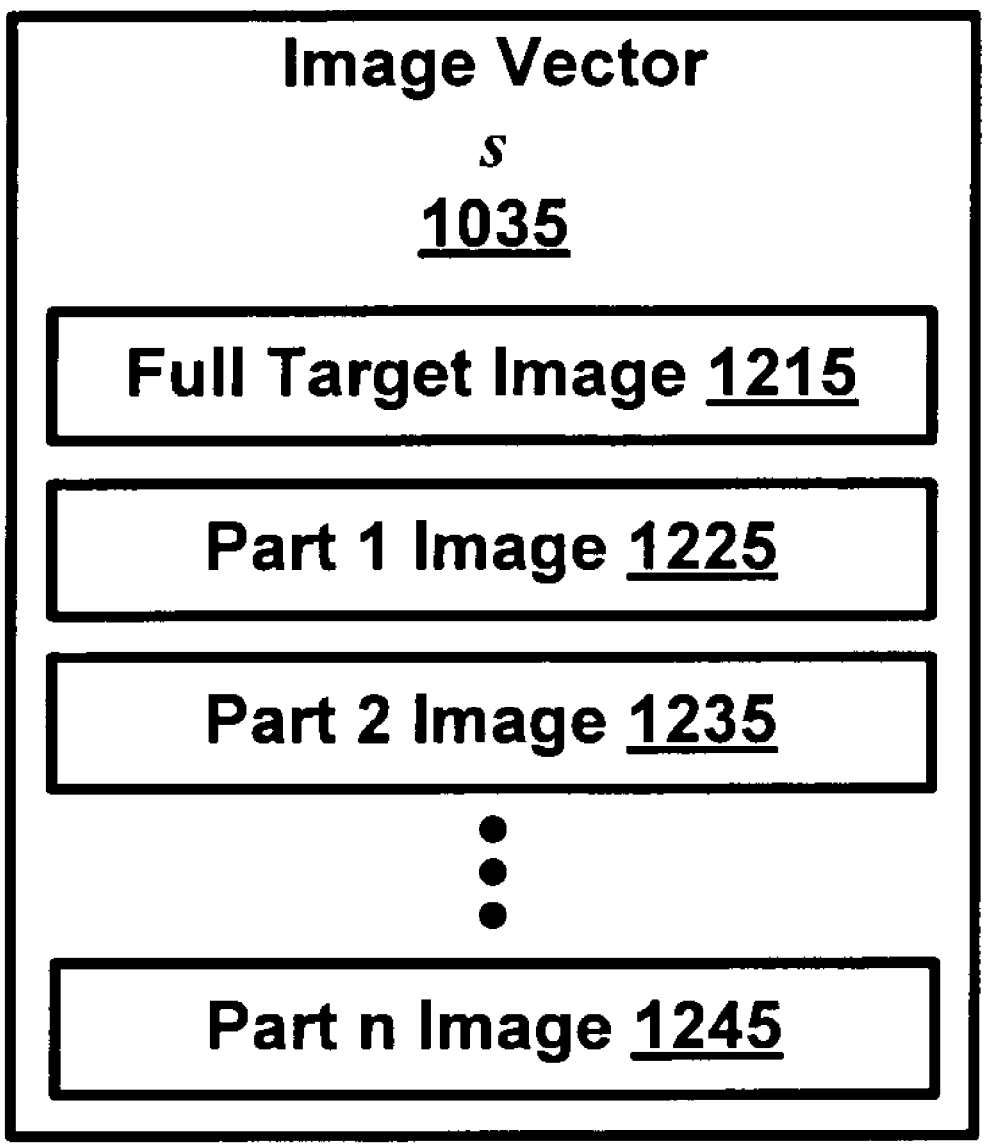
FIG. 14 is a block diagram of an image vector as per an aspect of an embodiment of the present invention.
Figure 15:
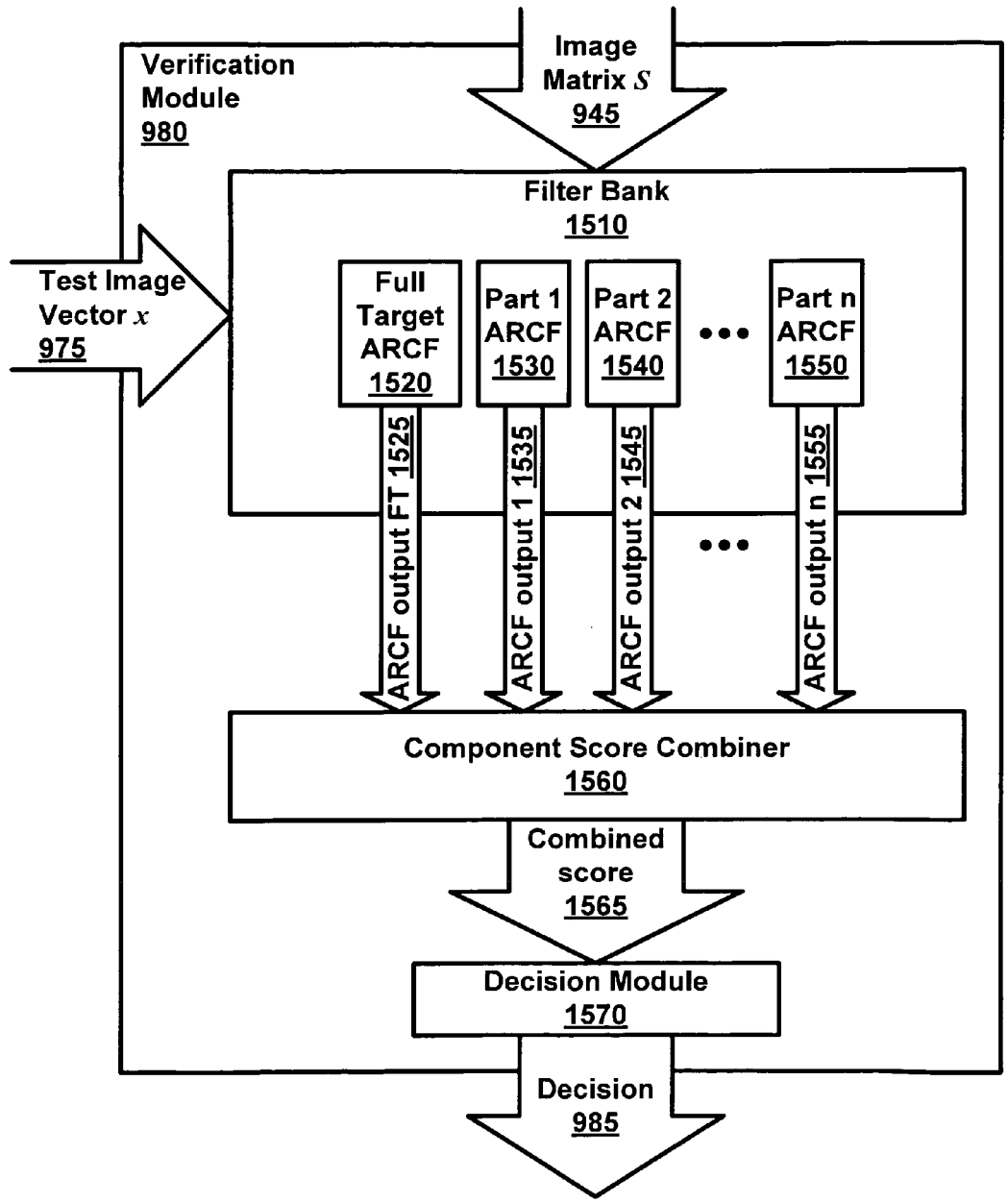
FIG. 15 is a block diagram of a verification module as per an aspect of an embodiment of the present invention.

Masking module 1030 is configured to generate an image vector 1035 from a preprocessed image 1025. This includes generating separate sub-images 1215, 1225, 1235 and 1245 from the preprocessed image 1025 image using a series of mask filters 1210, 1220, 1230 and 1240. FIG. 13A, FIG. 13B, FIG. 13C and FIG. 13D illustrate how this works. Each of the mask filters preferably isolates a part of the image in the area of a landmark. Landmarks may include the target object itself such as a truck or face, or object parts of the target object such as wheels, bumbers, eyes, and the like. In this example, the preprocessed image 1025 is an image that includes an electronic representation of a physical truck as a target is used to create a series of part images 1215, 1225, 1235 and 1245. FIG. 13A shows a full target image 1215 being created by applying a full target mask 1210 to preprocessed image 1025. FIG. 13B shows a part 1 target image 1225 being created by applying a part 1 mask 1210 to preprocessed image 1025. FIG. 13C shows a part 2 target image 1235 being created by applying a part 2 mask 1230 to preprocessed image 1025. FIG. 13D shows a part n target image 1245 being created by applying a part n mask 1240 to preprocessed image 1025. Each of the masks 1210, 1220, 1230 and 1240 isolates the area of the truck that incorporates the part of interest to generate the new part image 1215, 1225, 1235 and 1245. The image vector assembly module 1250 gathers these separate images 1215, 1225, 1235 and 1245 together to generate the image vector illustrated in FIG. 14.

In the case of enrollment, the image vector is a training image vector 935 that may be stored in an image database 940. The image database 940 preferably stores as many images that represents the physical training target 915 as possible. As test images are verified by the system to represent the same physical target, they may also be added to image database 940. The output of the image database may be reconfigured as an image matrix that includes collected versions of related image vectors 935. This process of creating the image matrix 945 may occur as part of the regular management of the image database 945 or outside the image database 945.

Figure 17:
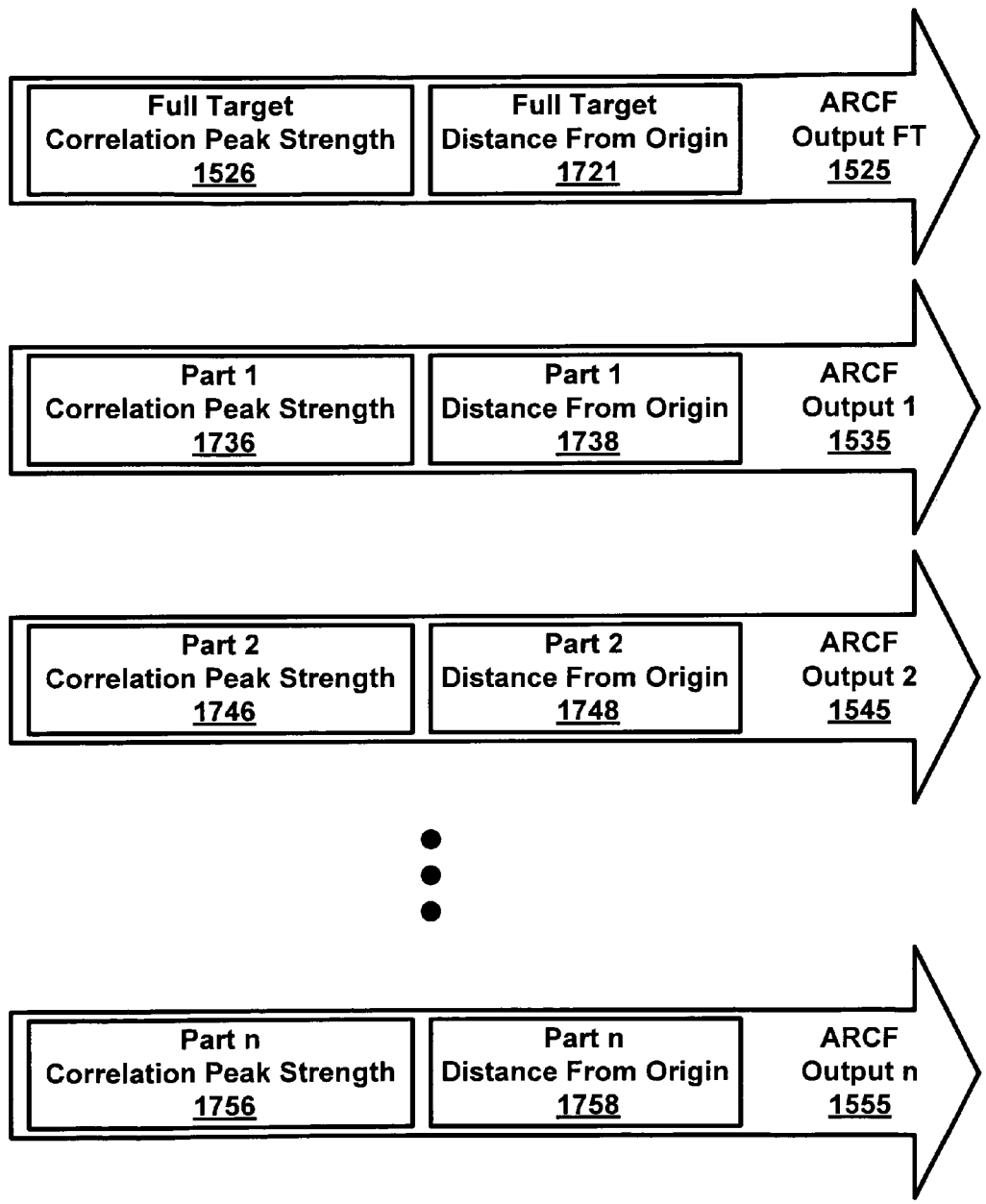
FIG. 17 is a block diagram of adaptive and robust correlation filter outputs as per an aspect of an embodiment of the present invention.

FIG. 980 shows an embodiment of the verification module 980. The module can be configured to accept an image vector 945 which contains images related to target 915 and a test image vector(s) related to the test target 955. Part specific content from the image matrix 945 and test image vector 975 are directed to the appropriate ARCF filter 1520, 1530, 1540 or 1550 in filter bank 1510. Each these filters 1520, 1530, 1540 or 1550 generate a part specific output 1525, 1535, 1545 ad 1555. These outputs are illustrated in FIG. 17. So for example, the full target filter 1520 will generate an output 1525 that includes full target correlation peak strength data 1526 and full target distance from origin data 1728, the part 1 filter 1530 will generate an output 1535 that includes part 1 correlation peak strength data 1536 and part 1 distance from origin data 1738, the part filter 1540 will generate an output 1545 that includes part 2 correlation peak strength data 1546 and part 2 distance from origin data 1748, and the part n filter 1550 will generate an output 1555 that includes part n correlation peak strength data 1556 and part n distance from origin data 1758. The correlation peak strength data 1726, 1736, 1746 and 1756 may include multiple values such as peak strength, dominant peak strength, weighted combinations of peak strength values, and the like. Similarly, the distance from origin data may include multiple values that relate to the dimensionality of the images. For example, a pure two dimensional image may yield an x distance form origin datum and a y distance form origin datum. Three dimensional data may include a z distance from origin datum. A temporal component could be added as a fourth datum. These values may also be reflective of the coordinate system used, so instead of being an x, y, and z value, the data could be representative of angle and length, and the like.

The ARCF filter outputs 1525, 1535, 1545 and 1555 may be utilized by a component score combiner module 1560 configured to derive a combined score 1565 using the correlation-peak-strength and distance-from-origin data. The combined score 1565 may be the result of linear or non-linear analysis and may include a simple value, a multidimensional data, a cluster analysis result, or the like. A decision module 1570 may then analyze the combined score 1565 to make a determination as to whether physical test target 955 matches a physical training target 915. This determination may include comparing the combined score against one or more thresholds.

Figure 16:
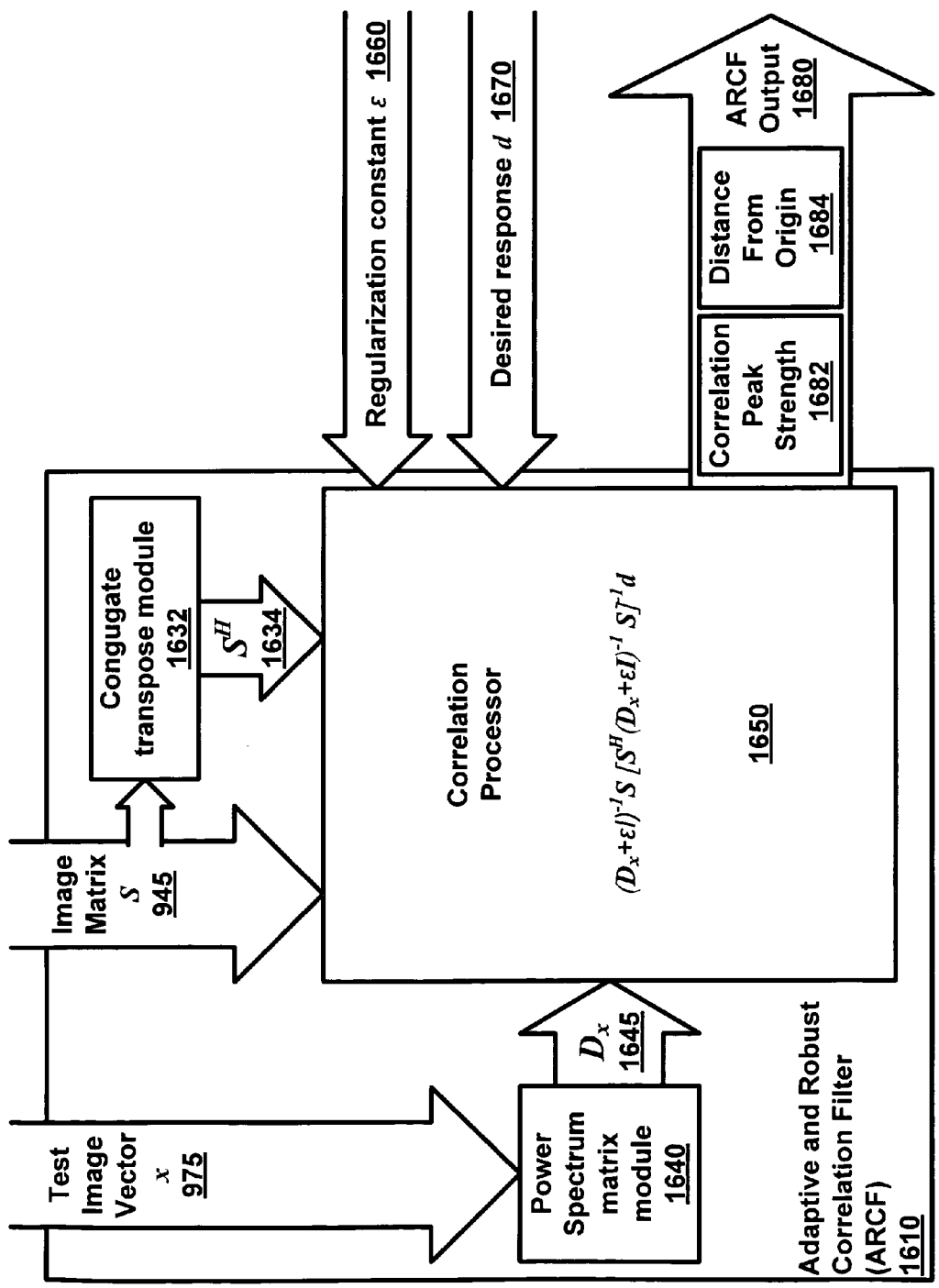
FIG. 16 is a block diagram of an adaptive and robust correlation filter as per an aspect of an embodiment of the present invention.

FIG. 16 is a block diagram of an adaptive and robust correlation filter as per an aspect of an embodiment of the present invention. The adaptive and robust correlation filter should be configured to generate correlation-peak-strength and distance-from-origin data using a multitude of related images, each of the multitude of related images representing a similar part of at least one larger image, at least one of the related images originating from at least one of the at least one test image, at least one of the related images originating from at least one of the at least one training image 915. The adaptive and robust correlation filter 1610 includes: a conjugate transpose module 1632, a power spectrum module 1640, and a correlation processor 1650. The conjugate transpose module 1643 should be configured to generate a conjugate transpose $S^H$ 1634 of image matrix S 945 that includes at least one training image vector that includes a vectorized representation of the training image(s) 925. The power spectrum module 1640 is preferably configured to generate a power spectrum matrix $D_x$ 1645 using at least one test image vector x 975, each of the at least one test image vector x that includes a vectorized representation of the test image(s) 965. The correlation processor is preferably configured to generate correlation-peak-strength and distance-from-origin data using the conjugate transpose $S^H$ 1634 and power spectrum matrix $D_x$ 1645 according to $h=(D_x+\epsilon I)^{-1}S[S^H(D_x+\epsilon I)^{-1}S]^{-1}d$. Regularization constant $\epsilon$ 1660 may input to the filter dynamically or alternatively, a specific value of $\epsilon$ 1660 may be used to build a specific family of filters for various parts. I is an identity matrix and d 1670 is a vector desired response with elements corresponding to at least one of the training image vector(s) in matrix S. As described earlier, the output of the filter 1680 includes the correlation peak strength 1682 and distance form origin 1684 data.

Experimental Results

Experimental results are presented bellow to show the feasibility and usefulness of the Recognition-by-parts architecture built around ARCF. The face images used in our experiments were selected from FERET and AR. The three reported similarity scores are F (Full Face), H (maximum for half faces), and P (combination of nose, mouth, and maximum for the eyes). To facilitate interpretation, the corresponding thresholds for FAR=1% are subtracted so positive numbers exceed the threshold. If any of the three similarity scores exceeds its corresponding threshold, authentication succeeds (Accept). If all three similarity scores are below their corresponding threshold, authentication fails (Reject).

Disguise

Figure 18A:
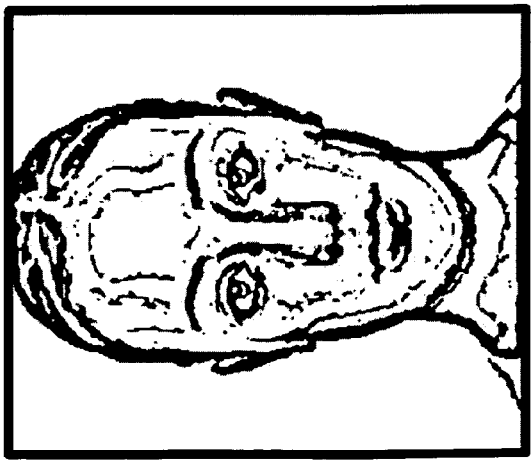
FIG. 18A shows a training image used in an experiment with aspect of an embodiment of the present invention applied to a disguised subject.
Figure 18B:
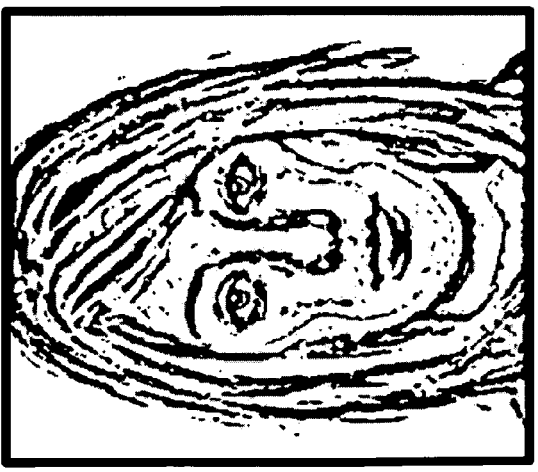
FIG. 18B shows a test image of the same target used in FIG. 18A with an application of face blush applied as a disguise.
Figure 18D:
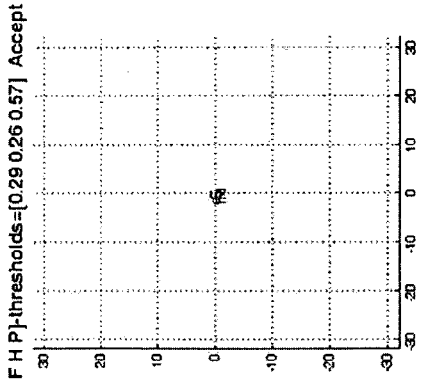
FIG. 18D shows correlation peaks associated with FIG. 18B obtained using an aspect of an embodiment of the present invention.
Figure 18C:
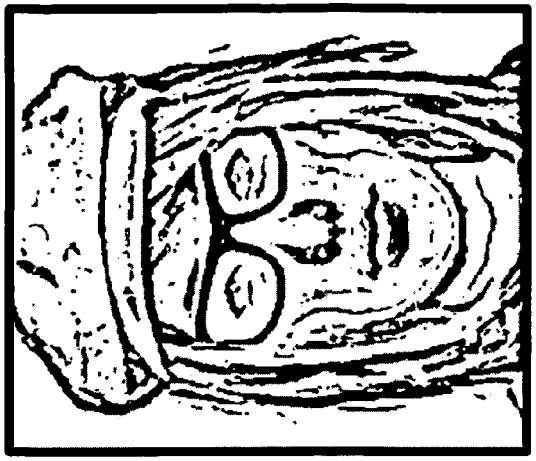
FIG. 18C shows a test image of the same target used in FIG. 18A with an application of face blush and sunglasses applied as a disguise.
Figure 18E:
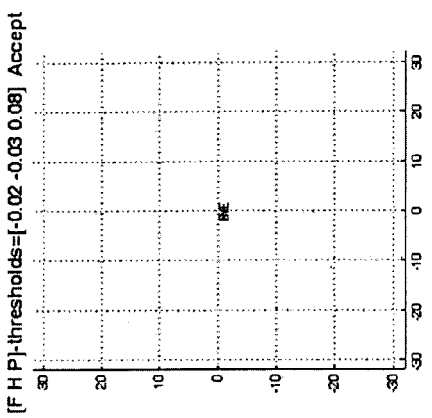
FIG. 18E shows correlation peaks associated with FIG. 18C obtained using an aspect of an embodiment of the present invention.

FIG. 18A shows a training image used in an experiment with aspect of an embodiment of the present invention applied to a disguised subject. FIG. 18B shows a test image of the same target used in FIG. 18A with an application of face blush applied as a disguise. FIG. 18C shows a test image of the same target used in FIG. 18A with an application of face blush and sunglasses applied as a disguise. These images in FIG. 18A, FIG. 18B and FIG. 18C come from makeoversolutions.com. FIG. 18D shows correlation peaks associated with FIG. 18B and FIG. 18E shows correlation peaks associated with FIG. 18C. Both of these results were obtained using an aspect of an embodiment of the present invention. For both test images shown in FIG. 18B and FIG. 18C, the parts' similarity score P is the strongest among the three similarity scores and it exceeds the threshold. Authentication succeeds to uncover the identity behind the disguise.

Wrong Assembly of the Face Parts and Severe Occlusion

Figure 19A:
FIG. 19A shows a training image used in an experiment with aspect of an embodiment of the present invention.
Figure 19B:
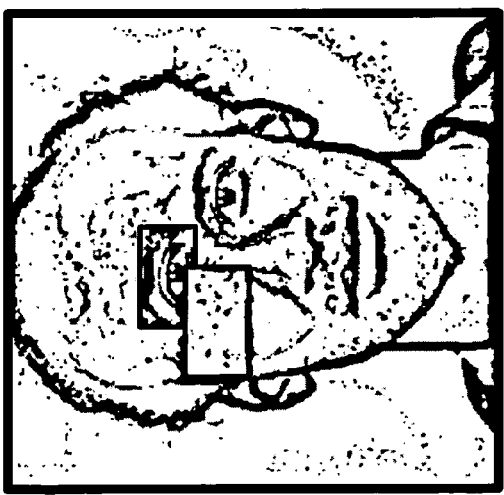
FIG. 19B shows a test image of the same target used in FIG. 19A where the test image is wrongly assembled.
Figure 19C:
FIG. 19C shows a test image of the same target used in FIG. 19A where the target is occluded using an image of a second subject.
Figure 19D:
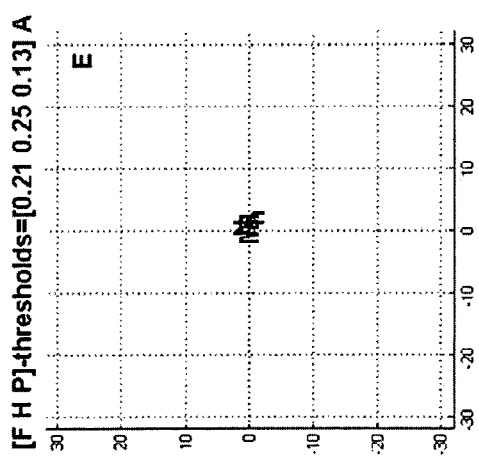
FIG. 19D shows correlation peaks associated with FIG. 19B obtained using an aspect of an embodiment of the present invention.
Figure 19E:
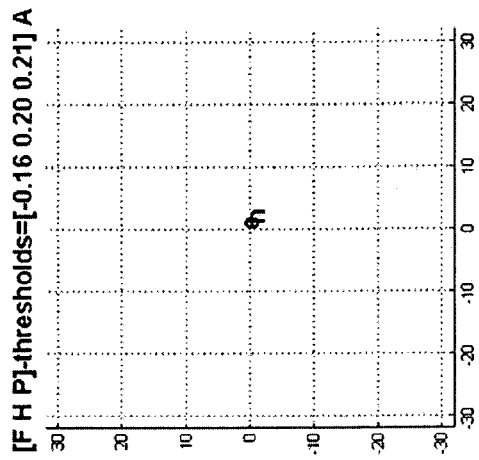
FIG. 19E shows correlation peaks associated with FIG. 19C obtained using an aspect of an embodiment of the present invention.

FIG. 19A shows a training image used in experiments that test the ability of an embodiment of the present invention to handle the wrong assembly of face parts and severe occlusion. FIG. 19B shows a test image of the same target used in FIG. 19A where the test image is wrongly assembled and FIG. 19C shows a test image of the same target used in FIG. 18A where the target is occluded using an image of a second subject. FIG. 19D shows correlation peaks associated with FIG. 19B obtained using an aspect of an embodiment of the present invention and FIG. 19E shows correlation peaks associated with FIG. 19C obtained using an aspect of an embodiment of the present invention.

The face images used in this experiment come from both the FERET and AR databases. The right eye of the test image in FIG. 19A is moved up and toward the right. The wrong assembly of the face parts is indicated by the position of the right eye away from the center. Verification still succeeds since the left half of the face matches well. In the second test shown in FIG. 19 B, the client is behind another person. Only the left eye and left half face are detected and in proper alignment. The score based on matching the full face is negative (below the corresponding threshold) indicating that verification based on the full face has failed. Verification, however, still succeeds because the good match on the left half face results in a good H score and the good match on the left eye yields a good P score.

Occlusion

Figure 20A:
FIG. 20A shows a training image used in an experiment with aspect of an embodiment of the present invention.
Figure 20B:
FIG. 20B shows a test image of the same target used in FIG. 20A where the target is occluded by sunglasses.
Figure 20C:
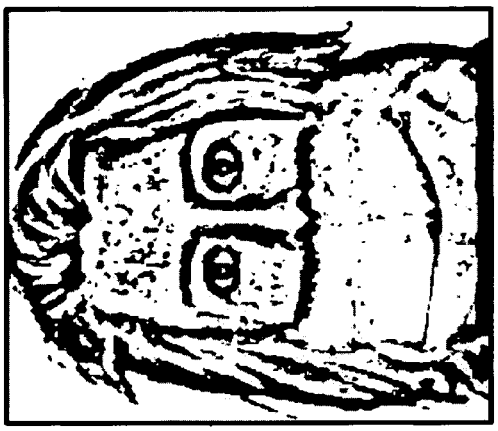
FIG. 20C shows a test image of the same target used in FIG. 20A where the target is occluded using a scarf.
Figure 20D:
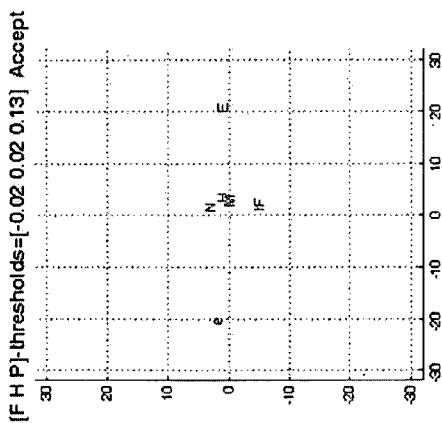
FIG. 20D shows correlation peaks associated with FIG. 20B obtained using an aspect of an embodiment of the present invention.
Figure 20E:
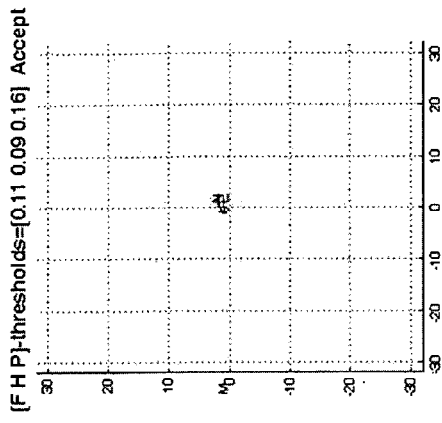
FIG. 20E shows correlation peaks associated with FIG. 20C obtained using an aspect of an embodiment of the present invention.

FIG. 20A shows a training image used in an occlusion experiment with aspect of an embodiment of the present invention. FIG. 20B shows a test image of the same target used in FIG. 20A where the target is occluded by sunglasses and FIG. 20C shows a test image of the same target used in FIG. 20A where the target is occluded using a scarf. FIG. 20D shows correlation peaks associated with FIG. 20B obtained using an aspect of an embodiment of the present invention and FIG. 20E shows correlation peaks associated with FIG. 20C obtained using an aspect of an embodiment of the present invention.

The faces shown in FIG. 20A, FIG. 20B and FIG. 20C come from the AR database, but the acceptance thresholds and optimal LDA projection w were derived using FERET. The strong correlation peaks for the parts that are not occluded are aligned such that the parts' similarity score P is the strongest among the three similarity scores and it exceeds the threshold. Authentication succeeds to uncover the identity behind the occlusion. The weak correlation peaks for the full face and eyes (see FIG. 20B with sunglasses), and mouth (see FIG. 20C with scarf) cannot prevent ARCF from locking on the correct authentication in both cases. This experiment also shows that holistic components do not help with recognition of occluded faces.

Varying Illumination

Figure 21A:
FIG. 21A shows a training image used in illumination experiments with aspect of an embodiment of the present invention.
Figure 21B:
FIG. 21B shows a test image of the same target used in FIG. 21A where the target is subjected to an increase in illumination.
Figure 21C:
FIG. 21C shows a test image of the same target used in FIG. 21A where the target is subjected to yet another increase in illumination.
Figure 21D:
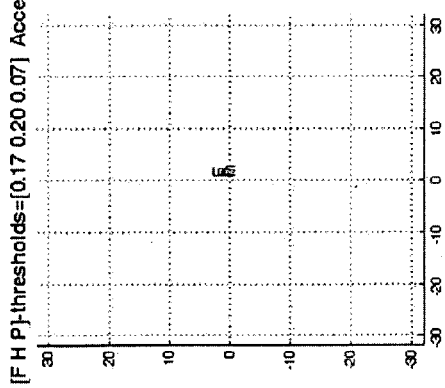
FIG. 21D shows correlation peaks associated with FIG. 21B obtained using an aspect of an embodiment of the present invention.
Figure 21E:
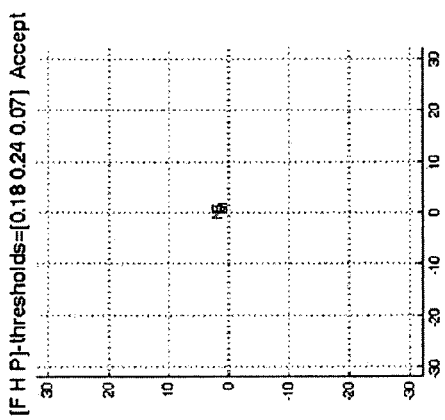
FIG. 21E shows correlation peaks associated with FIG. 21C obtained using an aspect of an embodiment of the present invention.

FIG. 21A shows a training image used in an illumination experiment with aspect of an embodiment of the present invention. FIG. 21B shows a test image of the same target used in FIG. 21A where the target is subjected to an increase in illumination. And FIG. 21C shows a test image of the same target used in FIG. 21A where the target is subjected to yet another increase in illumination. FIG. 21D shows correlation peaks associated with FIG. 21B obtained using an aspect of an embodiment of the present invention and FIG. 21E shows correlation peaks associated with FIG. 21C obtained using an aspect of an embodiment of the present invention.

The face images shown in FIG. 21A, FIG. 21B and FIG. 21C used for training and testing come from AR face database. The test images are different from the training ones in terms of varying illumination. The correlation peaks for the face seen in FIG. 21D and FIG. 21E are strong and aligned, the similarity scores exceed the corresponding thresholds, and authentication succeeds.

Temporal Change

Figure 22A:
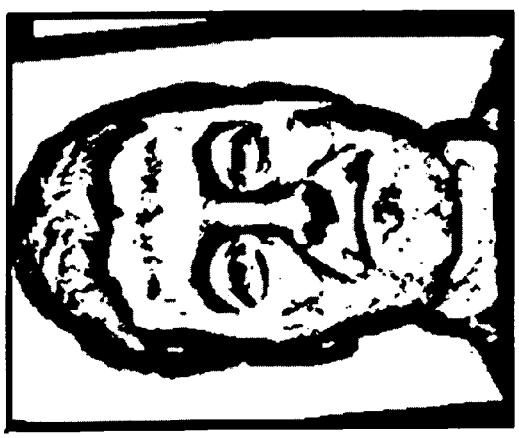
FIG. 22A shows a training image used in temporal variation experiments with aspect of an embodiment of the present invention.
Figure 22B:
FIG. 22B shows a test image of the same target used in FIG. 22A imaged a two years after FIG. 22A was imaged.
Figure 22C:
FIG. 22C shows a test image of the same target used in FIG. 22A imaged a short time after FIG. 22B was imaged.
Figure 22D:
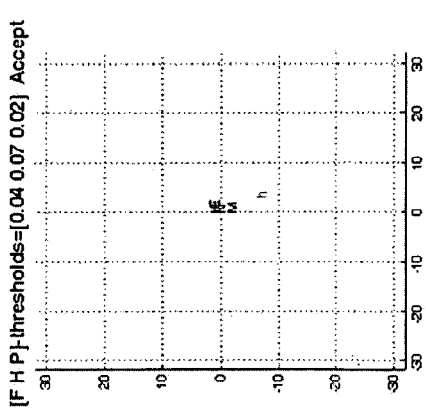
FIG. 22D shows correlation peaks associated with FIG. 22B obtained using an aspect of an embodiment of the present invention.
Figure 22E:
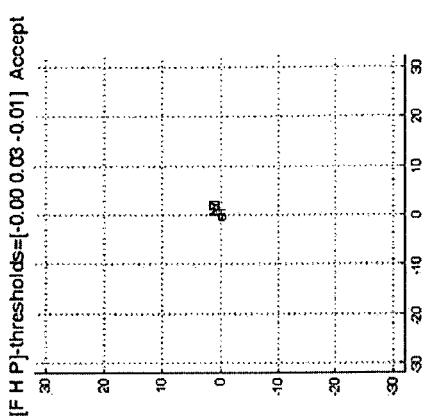
FIG. 22E shows correlation peaks associated with FIG. 22C obtained using an aspect of an embodiment of the present invention.

FIG. 22A shows a training image used in temporal variation experiments with aspect of an embodiment of the present invention. FIG. 22B shows a test image of the same target used in FIG. 22A imaged two years after FIG. 22A was imaged and FIG. 22C shows a test image of the same target used in FIG. 22A imaged a short time after FIG. 22B was imaged. FIG. 22D shows correlation peaks associated with FIG. 22B obtained using an aspect of an embodiment of the present invention and FIG. 22E shows correlation peaks associated with FIG. 22C obtained using an aspect of an embodiment of the present invention.

The face images in FIG. 22A, FIG. 22B and FIG. 22C used for training and testing come from the FERET database. The test images shown in FIG. 22B and FIG. 22C were acquired two years later compared to the training images (an example of which is shown in FIG. 22A). The correlation peaks for the face seen in FIG. 22D and FIG. 22E are strong and aligned, the similarity scores exceed the corresponding thresholds, and authentication succeeds.

CONCLUSIONS

This disclosure presents a novel implementation of the Recognition-by-parts paradigm for authentication of a target subject (such as a face, a truck or the like) to occlusion and noise. The architecture is built around new Adaptive and Robust Correlation Filters (ARCF) whose filter banks are optimized correlation filters (CF) for the part-based and holistic mix of face components. The adaptive aspect of ARCF comes from its use of both training and test data, while the robust aspect comes from the optimization of ARCF in order to decrease their sensitivity to noise and distortions. The combination of the filter bank's outputs for optimal authentication and impostor detection may be implemented using a technique such as LDA. Experimental evidence shows the feasibility and utility of ARCF for face recognition-by-parts, in general, and reliable recognition despite occlusion, disguise, illumination and temporal changes, in particular. Further extensions are possible using alternative image representations, e.g., Gabor or SIFT, and combining the ARCF outputs using boosting.

The following references have been used to help explain and enable this disclosure: [1] D. McNeill (1998), *The Face—A Natural History*, Little, Brown and Company; [2] M. A. Fischler and R. A. Elschlager (1973), The Representation and Matching of Pictorial Structures, *IEEE Trans. on Computers*, Vol. C-22, No. 1, 67-92; [3] S. Edelman, N. Intrator, and J. S. Jacobson (2002), Unsupervised Learning of Visual Structure, in H. H. Bulthoff, T. Poggio, S. W. Lee and C. Wallraven (Eds.), Lecture Notes in Computer Science, Vol. 2025, Springer, 629-643; [4] T. Kohonen (1987), *Self-Organization and Associative Memory*, Springer-Verlag; [5] R. Gross, J. Yang, and A. Waibel (2000), Face Recognition in a Meeting Room, 4*th Int. Conf. on Automatic Face and Gesture Recognition (FGR)*, Grenoble, France; [6] A. M. Martinez (2002) Recognizing Imprecisely Localized, Partially Occluded and Expression Variant Faces from a Single Sample per Class, *IEEE Trans. on Pattern Analysis and Machine Intelligence*, Vol. 24, No. 6, 748-763; [7] X. Tan, S. Chen, Z.-H. Zhou, and F. Zhang (2005), Recognizing Partially Occluded, Expression Variant Faces from Single Training Image per Person with SOM and Soft kNN Ensemble, *IEEE Trans. on Neural Networks*, Vol. 16, No. 4, 875-886; [8] S. Gutta and H. Wechsler (2003), Analysis of Partial-Faces for Face Recognition, 10*th Int. Conf. on Comp. Analysis of Images and Patterns (CAIP)*, Groningen, Netherlands, 630-637; [9] S. Gutta and H. Wechsler (2004), Face Recognition Using Asymmetric Faces, 1*st Int. Conf. on Biometric Authentication*, Hong Kong; [10] Y. Liu, K. L. Schmidt, J. F. Cohn, and R. L. Weaver (2002), Facial Asymmetry Quantification for Expression Invariant Human Identification, 16*th Int. Conf on Pattern Recognition (ICPR)*, Quebec-City, Canada; [11] Y. Liu, K. L. Schmidt, J. F. Cohn, and S. Mitra (2003), Facial Asymmetry Quantification for Expression Invariant Human Identification, *Computer Vision and Image Understanding*, Vol. 91, 138-159; [12] R. Thornhill and S. W. Gangestad (1999), Facial Attractiveness, *Trans. Cognitive Sciences*, 452-460; [13] C. K. Richardson, D. Bowers, R. M. Bauer, K. M. Heilman, and C. M. Leonard (2000), Digitizing the Moving face During Dynamic Displays of Emotion, *Neuropsychology*, 1028-1039; [14] G. Yovel and N. Kanwisher (2004), Face Perception Engages a Domain-Specific System for Processing both Configural and Part-Based Information about Faces, *Vision*, 4 (8), 133a; [15] G. Golarai, D. L. Eberhardt, K. Grill-Spector, and G. D. D. Gabrieli (2004), Representation of Parts and Canonical Face Configuration in the Amygdala, Superior Temporal Sulcus (STS) and the Fusiform "Face Area" (FFA), *Vision*, 4 (8), 131a; [16] B. Duchaine and K. Nakayama (2005), Dissociations of Face and Object Recognition in Developmental Prosopagnosia, *J. of Cognitive Neurosciences*, Vol. 17, No. 2, 1-13; [17] N. Kanwisher and M. Moscovitch (2000), The Cognitive Neuroscience of Face Processing: An Introduction, *J. of Cognitive Neuropsychology*, Vol. 17, No 1-3, 1-11; [18] E. McKone, P. Martini, and K. Nakayama (2001), Categorical Perception of Face Identity in Noise Isolates Configural Processing, *J. of Experimental Psychology: Human Perception and Performance*, Vol. 27, No. 3, 573-599; [19] M. Moscovitch, G. Winocur, and M. Behrmann (1997), What is Special About Face Recognition? *Journal of Cognitive Neuroscience*, Vol. 9, 555-604; [20] M. Lades, J. C. Vorbruggen, J. Buhmann, C. Malsburg, R. P. Wurtz, and W. Konen (1993), Distortion Invariant Object Recognition in the Dynamic Link Architecture, *IEEE Trans. on Computers*, Vol. 42, 300-311. K. Ma and X. Tang (2001), Discrete Wavelet Face Graph Matching, *Int. Conf. on Image Processing (ICIP)*, Thessaloniki, Greece, 217-220; [21] L. Wiscott, J. M. Fellous, N. Kruger, and C. von der Malsburg (1997), Face Recognition by Elastic Bunch Graph Matching, *IEEE Trans. on Pattern Analysis and Machine Intelligence*, Vol. 19, No. 7, 775-779; [22] K. Ma and X. Tang (2001), Discrete Wavelet Face Graph Matching, *Int. Conf. on Image Processing (ICIP)*, Thessaloniki, Greece, 217-220; [23] B. Heisele, P. Ho, J. Wu, and T. Poggio (2003), Face Recognition: Component-Based Versus Global Approaches, *Computer Vision and Image Understanding*, Vol. 91, 6-21; [24] S. Edelman and N. Intrator (2000), Coarse Coding of Shape Fragments+ Retinotopy~Representation of Structure, *Spatial Vision*, Vol. 13, 255-264; [25] C. F. Hester and D. Casasent (1980), Multivariant Technique for Multiclass Pattern Recognition, *Applied Optics* 19, 1758-1761; [26] B. B. K. Vijaya Kumar (1986), Minimum Variance Synthetic Discriminant Functions, *J. Opt. Soc. Am. A* 3, 1579-1584; [7] A. Mahalanobis, B. V. K. Vijaya Kumar, and D. Casasent (1987), Minimum Average Correlation Energy Filters, *Applied Optics* 26, 3633-3630; [28] P. Refregier (1991), Optimal Trade-off Filters for Noise Robustness, Sharpness of the Correlation Peak, and Horner Efficiency, *Opt. Lett.* 16, 829-831; [29] B. V. K. Vijaya Kumar, M. Savvides, C. Xie, K. Venkataramani, J. Thornton, and A. Mahalanobis (2004), Biometric Verification with Correlation Filters, *Applied Optics* 43, 391-402; [30] H. Cox, R. M. Zeskind and M. M. Owen (1987), Robust Adaptive Beamforming, *IEEE Trans. on ASSP*, Vol. 35, No. 10; [31] H. Wechsler, J. Huang, and P. Rauss (1998), The FERET Database and Evaluation Procedure for Face Recognition Algorithms, *Image and Vision Computing*, Vol. 16, No. 5, 295-306; [32] A. M. Martinez and R. Benavente (1998) *The AR Face Database*, CVC Technical Report #24, Purdue University.

An Alternative ARCF Derivation:

Consider the problem of minimizing f(h) where h is a complex vector subject to multiple constraints $c_1(h)$ and $c_2(h)$ as follows:

Minimize $f(h)=h^H D h$ subject to $c_1(h)=S^H h - d = 0$ and $c_2(h)=h^H h - \alpha = 0$ where d is a constant vector and $\alpha$ is a constant scalar. This multiple equality constraint problem can be converted to an equivalent unconstraint minimization of the Lagrangian function $L(\lambda, h)$ where $\lambda$ is a complex vector of Lagrange multipliers $$L(\lambda, h, h^H) = h^H D h + 2Re[\lambda_1^H(S^H h - d)] + 2Re[\lambda_2^H(h^H h - \alpha)] = h^H D h + \lambda_1^H(S^H h - d) + (h^H S - d^H)\lambda_1 + \lambda_2^H(h^H h - \alpha) + (h^H h \alpha^H)\lambda_2.$$

To find the optimal $h_o$ that minimizes $L(\lambda, h, h^H)$, one computes the gradient of $L(\lambda, h, h^H)$ with respect to $h^H$ and sets it equals to zero $$\nabla L(\lambda, h, h^H) = D h_o + S \lambda_1 + \lambda_2^H h_o + h_o \lambda_2 = D h_o + S \lambda_1 + 2Re[\lambda_2] h_o = 0$$

Let $\epsilon = 2Re[\lambda_2]$ and solve for k to find $h_o = -(D+\epsilon I)^{-1} S \lambda_1$. To satisfy the constraint $c_1(h_o) = S^H h_o - d = 0$, one substitutes for $h_o$ into $c_1(h_o)$ and solves for $\lambda_1$. After some algebraic manipulation, the solution found is $h_o = (D+\epsilon I)^{-1} S [S^H (D+\epsilon I)^{-1} S]^{-1} d$ where $\epsilon$ is chosen to satisfy the constraint $c_2(h_o) = h_o^H h_o - \alpha = 0$.

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e hardware with a biological element) or a combination thereof, all of which are behaviorally equivalent. For example, the ARCF filter may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement the ARCF filter using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of verifying a human subject by analyzing training and test images of the subjects face. However, one skilled in the art will recognize that embodiments of the invention could be used to verify other subjects such as an animal, a plant or an automobile.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A correlation filter for determining if a physical test target in at least one test image obtained using an imaging device matches a physical training target in at least one training image, comprising:
   a) a conjugate transpose module configured to generate a conjugate transpose $S^H$ of an image matrix S that includes at least one training image vector, each of the at least one training image vector including a vectorized representation of the at least one training image;
   b) a power spectrum module configured to generate a power spectrum matrix $D_x$ using at least one test image vector x, each of the at least one test image vector x including a vectorized representation of the at least one test image; and c) a correlation processor configured to generate correlation-peak-strength and distance-from-origin data using the conjugate transpose SH and power spectrum matrix $D_x$ according to $h=(D_x+\epsilon I)^{-1}S[S^H(D_x+\epsilon I)^{-1}S]^{-1}d$; and wherein:

i) $\epsilon$ is a regularization constant;

ii) I is an identity matrix; and iii) $D_x$ is a vector desired response with elements corresponding to at least one of the at least one training image vector in matrix S.

2. A correlation filter according to claim 1, wherein the imaging device is at least one of the following:

a) a digital camera;
b) a camcorder;
c) a scanner;
d) a screen capture utility;
e) a video capture device;
f) a computer;
g) a radio frequency imaging device;
h) a radar;
i) an MRI; and
j) a sonar.

3. The correlation filter according to claim 1, wherein the physical training target is a human face.

4. The correlation filter according to claim 1, wherein the physical training target is at least one of the following:
a) an automobile;
b) a tank;
c) an animal;
d) a building; and
e) a terrain; or
f) a target including a combination of the above.

5. The correlation filter according to claim 1, wherein:

a) at least one of the at least one training image is a training sub-image of a larger training image; and
b) at least one of the at least one test image is a test sub-image of a larger test image.

6. The correlation filter according to claim 5, wherein:

a) the training sub-image was generated using a masking filter configured to isolate a part of the image in the area of a landmark; and
b) the test sub-image was generated using an equivalent masking filter that is configured to isolate a part of the image in the area of an equivalent landmark.

7. The correlation filter according to claim 5, wherein the training sub-image was generated using a separate imaging device from at least one other sub-image.

8. The correlation filter according to claim 1, wherein the correlation filter is configured to operate in cooperation with a multitude of other correlation filters, each of the multitude of other correlation filters being configured to operate on images processed using a correlation filter specific masking filter.

9. The correlation filter according to claim 8, wherein a combined score is generated using the output of the correlation filter and the multitude of other correlation filters.

10. The correlation filter according to claim 9, wherein the combined score is used to determining if the physical test target matches the physical training target.

11. A recognition-by-parts authentication system for determining if a physical test target represented in at least one test image obtained using an imaging device matches a physical training target represented in at least one training image, comprising: a multitude of adaptive and robust correlation filters, each of the multitude of adaptive and robust correlation filters configured to generate correlation-peak-strength and distance-from-origin data using a multitude of related images, each of the multitude of related images representing a similar part of at least one larger image, at least one of the related images originating from at least one of the at least one test image, at least one of the related images originating from at least one of the at least one training image, wherein at least one of the multitude of adaptive and robust correlation filters includes:

a) a conjugate transpose module configured to generate a conjugate transpose $S^H$ of an image matrix S that includes at least one training image vector, each of the at least one training image vector including a vectorized representation of the at least one training image;

b) a power spectrum module configured to generate a power spectrum matrix $D_x$ using at least one test image vector x, each of the at least one test image vector x including a vectorized representation of the at least one test image; and c) a correlation processor configured to generate correlation-peak-strength and distance-from-origin data using the conjugate transpose SH and power spectrum matrix $D_x$ according to $h=(D_x+\epsilon I)^{-1}S[S^H(D_x+\epsilon I)^{-1}S]^{-1}d$; and wherein:

i) $\epsilon$ is a regularization constant;

ii) I is an identity matrix; and iii) $D_x$ is a vector desired response with elements corresponding to at least one of the at least one training image vector in matrix S.

12. The recognition-by-parts authentication system according to claim 11, further including a component score combination module configured to derive a combined score using the correlation-peak-strength and distance-from-origin data.

13. The recognition-by-parts authentication system according to claim 12, further including a decision module configured to make a target match determination from the combined score.

14. The recognition-by-parts authentication system according to claim 11, wherein the physical test target and physical training target is a human face.

15. The recognition-by-parts authentication system according to claim 11, wherein the physical test target and physical training target is at least one of the following:

a) an automobile;
b) a tank;
c) an animal;
d) a building; and
e) a terrain; or
f) a combination of the above.

16. The recognition-by-parts authentication system according to claim 11, further including an image processing module configured to create a training image vector from a training image.

17. The recognition-by-parts authentication system according to claim 11, further including an image processing module configured to create an image vector from an image.

18. The recognition-by-parts authentication system according to claim 11, further including an image vector database configured to generate the image matrix from the training images vectors.

\* \* \* \* \*